United States Patent
Sakai et al.

(10) Patent No.: US 9,692,641 B2
(45) Date of Patent: Jun. 27, 2017

(54) NETWORK CONNECTING METHOD AND ELECTRONIC DEVICE

(71) Applicants: FUJITSU FSAS INC., Tokyo (JP); FUJITSU LIMITED, Kawasaki-shi, Kanagawa (JP)

(72) Inventors: Kouji Sakai, Shinagawa (JP); Seigo Kotani, Kobe (JP)

(73) Assignees: FUJITSU FSAS INC., Tokyo (JP); FUJITSU LIMITED, Kawasaki (JP)

( * ) Notice: Subject to any disclaimer, the term of this patent is extended or adjusted under 35 U.S.C. 154(b) by 524 days.

(21) Appl. No.: 13/967,166

(22) Filed: Aug. 14, 2013

(65) Prior Publication Data
US 2014/0068046 A1 Mar. 6, 2014

(30) Foreign Application Priority Data
Aug. 31, 2012 (JP) ................................. 2012-192644

(51) Int. Cl.
G06F 15/173 (2006.01)
H04L 12/24 (2006.01)
H04L 29/06 (2006.01)

(52) U.S. Cl.
CPC ...... H04L 41/0806 (2013.01); H04L 63/0853 (2013.01); H04L 63/0869 (2013.01); H04L 63/0884 (2013.01)

(58) Field of Classification Search
None
See application file for complete search history.

(56) References Cited

U.S. PATENT DOCUMENTS 8,522,018 B2 * 8/2013 Molina .................. H04L 63/08
709/203
8,856,918 B1 * 10/2014 Efstathopoulos ....... G06F 21/31
713/184

(Continued)

FOREIGN PATENT DOCUMENTS

JP 2001-345795 12/2001
JP 2003-30155 1/2003

(Continued)

OTHER PUBLICATIONS

Extended European Search Report mailed Nov. 25, 2013 in corresponding European Application No. 13 18 0225.

*Primary Examiner* — Padma Mundur
(74) *Attorney, Agent, or Firm* — Staas & Halsey LLP

(57) ABSTRACT

A first electronic device stores first configuration information of the first electronic device collected by a tamper-resistant chip on the first electronic device and approved by a third-party device in the portable medium. A second electronic device stores second configuration information of the second electronic device collected by a tamper-resistant chip on the second electronic device and approved by the third-party device in the portable medium and acquires the first configuration information from the portable medium. The first electronic device transmits the first configuration information of the first electronic device and the second configuration information of the second electronic device acquired from the portable medium to the second electronic device over a long-distance network. The second electronic device controls connection between the first and the second electronic devices over the long-distance network based on the first configuration information and the second configuration information received from the first electronic device.

5 Claims, 30 Drawing Sheets

(56) References Cited

U.S. PATENT DOCUMENTS

| | | |
|---|---|---|
| 2002/0095587 A1* | 7/2002 | Doyle et al. .................. 713/186 |
| 2007/0104112 A1* | 5/2007 | Sayers .................... H04L 63/20 370/252 |
| 2007/0165264 A1 | 7/2007 | Minami et al. |
| 2010/0299518 A1* | 11/2010 | Viswanathan et al. ....... 713/152 |
| 2011/0237234 A1 | 9/2011 | Kotani et al. |
| 2013/0005246 A1* | 1/2013 | Waters ..................... H04B 5/02 455/41.1 |
| 2014/0020081 A1* | 1/2014 | Zhang .................. H04L 63/083 726/9 |

FOREIGN PATENT DOCUMENTS

| | | |
|---|---|---|
| JP | 2006-197063 | 7/2006 |
| JP | 2009-134731 | 6/2009 |
| JP | 2011-30608 | 2/2011 |
| WO | 02/17048 A2 | 2/2002 |
| WO | 02/17048 A3 | 2/2002 |
| WO | 2007/104923 A1 | 9/2007 |

\* cited by examiner

FIG.14

| YEAR, MONTH, AND DATE OF CREATION | TIME OF CREATION | POLICY | PERMISSIBILITY |
|---|---|---|---|
| YY/MM/DD | HH:MM:SS | MOVE DATA TO IC CARD | PERMITTED |
| YY/MM/DD | HH:MM:SS | ACQUIRE DATA FROM IC CARD | PERMITTED |

| DEGREE OF MATCH | CONNECTION LEVEL |
|---|---|
| 30 | MOVE DATA TO IC CARD |
| 40 | ACQUIRE DATA FROM IC CARD |

| ENTRY NUMBER | ENTRY |
|---|---|
| 1 | CONFIGURATION INFORMATION CORRESPONDING TO DEVICE CONFIGURATION PORTION OF IC CARD (HASH) |
| ... | ... |

| YEAR, MONTH, AND DATE OF CREATION | TIME OF CREATION | DEVICE CREATED | SIGNATURE INFORMATION | CONFIGURATION INFORMATION 1 | ... |
|---|---|---|---|---|---|
| YY/MM/DD | HH:MM:SS | IC CARD | DIGITAL SIGNATURE C | CONFIGURATION INFORMATION CORRESPONDING TO DEVICE CONFIGURATION PORTION | ... |

FIG.19

| ENTRY NUMBER | ENTRY |
|---|---|
| 1 | CONFIGURATION INFORMATION REPRESENTING BOOT BLOCK PORTION OF MOBILE TERMINAL (HASH) |
| 2 | CONFIGURATION INFORMATION REPRESENTING BIOS PORTION OF MOBILE TERMINAL (HASH) |
| 3 | CONFIGURATION INFORMATION REPRESENTING DEVICE CONFIGURATION PORTION OF MOBILE TERMINAL (HASH) |
| ... | ... |

| YEAR, MONTH, AND DATE OF CREATION | TIME OF CREATION | DESIGNATION CONFIGURATION INFORMATION |
|---|---|---|
| YY/MM/DD | HH:MM:SS | CONFIGURATION INFORMATION 210a OF WIRELESS LAN ROUTER 200a (HASH) |
| ... | ... | ... |

| YEAR, MONTH, AND DATE OF CREATION | TIME OF CREATION | POLICY | PERMISSIBILITY |
|---|---|---|---|
| YY/MM/DD | HH:MM:SS | REFER TO LOG ON WIRELESS LAN ROUTER | PERMITTED |
| YY/MM/DD | HH:MM:SS | MODIFY LOG ON WIRELESS LAN ROUTER | REJECTED |
| YY/MM/DD | HH:MM:SS | MOVE DATA TO IC CARD | PERMITTED |
| YY/MM/DD | HH:MM:SS | ACQUIRE DATA FROM IC CARD | PERMITTED |

FIG.22

| DEGREE OF MATCH | NETWORK CONNECTION LEVEL |
|---|---|
| 30 | REFER TO LOG ON WIRELESS LAN ROUTER |
| 40 | REFER TO SETTING IN WIRELESS LAN ROUTER (LOW SECURITY) |
| 50 | REFER TO SETTING IN WIRELESS LAN ROUTER (HIGH SECURITY) |
| 60 | MODIFY SETTING IN WIRELESS LAN ROUTER (LOW SECURITY) |
| 70 | MODIFY SETTING IN WIRELESS LAN ROUTER (HIGH SECURITY) |
| 30 | REFER TO LOG ON PERSONAL COMPUTER |
| 40 | REFER TO SETTING IN PERSONAL COMPUTER (LOW SECURITY) |
| 50 | REFER TO SETTING IN PERSONAL COMPUTER (HIGH SECURITY) |
| 60 | MODIFY SETTING IN PERSONAL COMPUTER (LOW SECURITY) |
| 70 | MODIFY SETTING IN PERSONAL COMPUTER (HIGH SECURITY) |
| 30 | REFER TO FILE ON PERSONAL COMPUTER |
| 40 | ADD FILE TO PERSONAL COMPUTER |
| 50 | MODIFY FILE ON PERSONAL COMPUTER |
| 60 | DELETE FILE ON PERSONAL COMPUTER |
| 70 | SHARE FILE ON PERSONAL COMPUTER |
| 80 | FORWARD FILE ON PERSONAL COMPUTER TO EXTERNAL |
| 30 | MOVE DATA TO IC CARD |
| 25 | ACQUIRE DATA FROM IC CARD |

FIG.23

| YEAR, MONTH, AND DATE OF EVENT | TIME OF EVENT | OPERATED DEVICE | OPERATOR | DESCRIPTION OF OPERATION | NAME OF VENDOR |
|---|---|---|---|---|---|
| YY/MM/DD | HH:MM:SS | MOBILE TERMINAL | MR. A | CREATED CONFIGURATION INFORMATION REPORT | MOBILE VENDOR A |
| YY/MM/DD | HH:MM:SS | MOBILE TERMINAL | MR. A | SENT CONFIGURATION INFORMATION REPORT | MOBILE VENDOR A |

FIG.24

| YEAR, MONTH, AND DATE OF CREATION | TIME OF CREATION | DEVICE CREATED | SIGNATURE INFORMATION | CONFIGURATION INFORMATION 1 | CONFIGURATION INFORMATION 2 | ... | CONFIGURATION INFORMATION N |
|---|---|---|---|---|---|---|---|
| YY/MM/DD | HH:MM:SS | MOBILE TERMINAL 100 | DIGITAL SIGNATURE A | CONFIGURATION INFORMATION REPRESENTING BOOT BLOCK PORTION (HASH) | CONFIGURATION INFORMATION REPRESENTING DEVICE CONFIGURATION PORTION (HASH) | ... | ... |

| ENTRY NUMBER | ENTRY |
|---|---|
| 1 | CONFIGURATION INFORMATION REPRESENTING BOOT BLOCK PORTION OF WIRELESS LAN ROUTER (HASH) |
| 2 | CONFIGURATION INFORMATION REPRESENTING BIOS PORTION OF WIRELESS LAN ROUTER (HASH) |
| 3 | CONFIGURATION INFORMATION REPRESENTING DEVICE CONFIGURATION PORTION OF WIRELESS LAN ROUTER (HASH) |
| ... | ... |

| YEAR, MONTH, AND DATE OF CREATION | TIME OF CREATION | DESIGNATION CONFIGURATION INFORMATION |
|---|---|---|
| YY/MM/DD | HH:MM:SS | CONFIGURATION INFORMATION 110a OF WIRELESS MOBILE TERMINAL (HASH) |
| ... | ... | ... |

| YEAR, MONTH, AND DATE OF CREATION | TIME OF CREATION | POLICY | PERMISSIBILITY |
|---|---|---|---|
| YY/MM/DD | HH:MM:SS | REFER TO LOG ON WIRELESS LAN ROUTER | PERMITTED |
| YY/MM/DD | HH:MM:SS | MODIFY LOG ON WIRELESS LAN ROUTER | REJECTED |
| YY/MM/DD | HH:MM:SS | MOVE DATA TO IC CARD | PERMITTED |
| YY/MM/DD | HH:MM:SS | ACQUIRE DATA FROM IC CARD | PERMITTED |

| YEAR, MONTH, AND DATE OF EVENT | TIME OF EVENT | OPERATED DEVICE | OPERATOR | DESCRIPTION OF OPERATION | NAME OF VENDOR |
|---|---|---|---|---|---|
| YY/MM/DD | HH:MM:SS | WIRELESS LAN ROUTER | MR. A | CREATED CONFIGURATION INFORMATION REPORT | ROUTER VENDOR A |
| YY/MM/DD | HH:MM:SS | WIRELESS LAN ROUTER | MR. A | SENT CONFIGURATION INFORMATION REPORT | ROUTER VENDOR A |

FIG.30

| YEAR, MONTH, AND DATE OF CREATION | TIME OF CREATION | DEVICE CREATED | SIGNATURE INFORMATION | CONFIGURATION INFORMATION 1 | CONFIGURATION INFORMATION 2 | ... | CONFIGURATION INFORMATION N |
|---|---|---|---|---|---|---|---|
| YY/MM/DD | HH:MM:SS | WIRELESS LAN ROUTER | DIGITAL SIGNATURE B | CONFIGURATION INFORMATION REPRESENTING BOOT BLOCK PORTION (HASH) | CONFIGURATION INFORMATION REPRESENTING DEVICE CONFIGURATION PORTION (HASH) | ... | ... |

| CONFIGURATION ITEM | | VALUE |
|---|---|---|
| BOOT BLOCK | BOOT BLOCK a (HASH) | 10 |
| | BOOT BLOCK b (HASH) | 3 |
| | BOOT BLOCK c (HASH) | 1 |
| | N/A | 0 |
| BIOS | BIOS-a (HASH) | 10 |
| | BIOS-b (HASH) | 3 |
| | BIOS-c (HASH) | 1 |
| | N/A | 0 |
| MBR | MBR-a (HASH) | 10 |
| | MBR-b (HASH) | 3 |
| | MBR-c (HASH) | 1 |
| | N/A | 0 |
| OS BOOT SECTOR | OS BOOT SECTOR a (HASH) | 10 |
| | OS BOOT SECTOR b (HASH) | 3 |
| | OS BOOT SECTOR c (HASH) | 1 |
| | N/A | 0 |
| OS BOOT BLOCK | OSBOOT BLOCK a (HASH) | 10 |
| | OSBOOT BLOCK b (HASH) | 3 |
| | OSBOOT BLOCK c (HASH) | 1 |
| | N/A | 0 |
| OS BOOT MANAGER | OS BOOT MANAGER a (HASH) | 10 |
| | OS BOOT MANAGER b (HASH) | 3 |
| | OS BOOT MANAGER c (HASH) | 1 |
| | N/A | 0 |
| OS LOADER | OS LOADER a (HASH) | 10 |
| | OS LOADER b (HASH) | 3 |
| | OS LOADER c (HASH) | 1 |
| | N/A | 0 |
| PHYSICAL TCG CHIP | PHYSICAL TPM CHIP a (HASH) | 10 |
| | PHYSICAL TPM CHIP b (HASH) | 3 |
| | PHYSICAL TPM CHIP c (HASH) | 1 |
| | NONE | 0 |
| PHYSICAL TCG VERSION | PHYSICAL TPM VERSION a (HASH) | 10 |
| | PHYSICAL TPM VERSION b (HASH) | 3 |
| | PHYSICAL TPM VERSION c (HASH) | 1 |
| IC CARD TYPE | IC CARD TYPE a | 10 |
| | IC CARD TYPE b | 3 |
| | IC CARD TYPE c | 1 |

FIG.33

| YEAR, MONTH, AND DATE OF EVENT | TIME OF EVENT | OPERATED DEVICE | OPERATOR | DESCRIPTION OF OPERATION | NAME OF VENDOR |
|---|---|---|---|---|---|
| YY/MM/DD | HH:MM:SS | ISP | MR. C | ADDED INFORMATION TO BOOT BLOCK PORTION OF LEVELING POLICY | MOBILE VENDOR A |
| YY/MM/DD | HH:MM:SS | ISP | MR. C | ADDED INFORMATION TO BIOS PORTION OF LEVELING POLICY | MOBILE VENDOR A |

310b

NETWORK CONNECTING METHOD AND ELECTRONIC DEVICE

CROSS-REFERENCE TO RELATED APPLICATION

This application is based upon and claims the benefit of priority of the prior Japanese Patent Application No. 2012-192644, filed on Aug. 31, 2012, the entire contents of which are incorporated herein by reference.

FIELD

The embodiments discussed herein are related to a network connecting method and the like.

BACKGROUND

For data communication between devices over a wireless local area network (LAN), some security standards have been recently developed by the Institute of Electrical and Electronic Engineers (IEEE), for example, and data communication can be performed relatively safely by following these standards.

For example, in a case of a wireless LAN, because devices communicate with each other in a relatively small area where the radio waves can be received, and a user of each of the devices can check the other devices belonging to other communicating users, available is a technology in which a shared private key is distributed to and used among the devices belonging to communicating users who can be identified by one another, to achieve highly confidential wireless communication. Examples of related art include those disclosed in Japanese Laid-open Patent Publication No. 2001-345795, Japanese Laid-open Patent Publication No. 2006-197063, Japanese Laid-open Patent Publication No. 2009-134731, Japanese Laid-open Patent Publication No. 2011-030608, and Japanese Laid-open Patent Publication No. 2003-030155.

In establishing connection between devices over a network, such a conventional technology can fail to establish connection to appropriate designation devices.

To establish a secure connection between all devices connected not only to a wireless LAN but also to a long-distance network such as the Internet, it is necessary to determine if a designation device is a legitimate designation. In making such a determination as to whether the designation device is a legitimate designation, information such as a unique number of the device, a media access control (MAC) address, an Internet Protocol (IP) address, a Wired Equivalent Privacy (WEP) key, or a serial number of the device is used. However, because these types of information are information that can be falsified by a third party, the conventional technology is incapable of validating the legitimacy of a designation appropriately.

SUMMARY

According to an aspect of an embodiment, a network connecting method includes first storing at which a first electronic device stores first configuration information of the first electronic device collected by a tamper-resistant chip mounted on the first electronic device and approved by a third-party device in a portable medium; second storing at which a second electronic device stores second configuration information of the second electronic device collected by a tamper-resistant chip mounted on the second electronic device and approved by a third-party device in the portable medium; acquiring at which the second electronic device acquires the first configuration information from the portable medium; transmitting at which the first electronic device transmits the first configuration information of the first electronic device and the second configuration information of the second electronic device that is acquired from the portable medium to the second electronic device over a long-distance network; and controlling at which the second electronic device controls connection between the first electronic device and the second electronic device over the long-distance network based on the first configuration information and the second configuration information received from the first electronic device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a schematic of an example of data structure of a corresponding policy for the IC card;

FIG. 15 is a schematic of an example of a data structure of a determination table for the IC card;

FIG. 16 is a schematic of an example of a data structure of configuration information stored in a TPM chip on the IC card;

FIG. 17 is a schematic of an example of a data structure of a configuration information report 30A;

FIG. 19 is a schematic of an example of a data structure of configuration information stored in a TPM chip on the mobile terminal;

FIG. 20 is a schematic of an example of a data structure of a connection permission list 110b in the mobile terminal;

FIG. 21 is a schematic of an example of a data structure of the corresponding policy for the mobile terminal;

FIG. 22 is a schematic of an example of a data structure of a determination table for the mobile terminal;

FIG. 23 is a schematic of an example of a data structure of an operation log of the mobile terminal;

FIG. 24 is a schematic of an example of a data structure of a configuration information report 100A;

FIG. 26 is a schematic of an example of a data structure of configuration information stored in a TPM chip on the wireless LAN router;

FIG. 27 is a schematic of an example of a data structure of a connection permission list 210b for the wireless LAN router;

FIG. 28 is a schematic of an example of a data structure of a corresponding policy for the wireless LAN router;

FIG. 29 is a schematic of an example of a data structure of an operation log of the wireless LAN router;

FIG. 30 is a schematic of an example of a data structure of a configuration information report 200A;

FIG. 32 is a schematic of an example of a data structure of a approval policy;

FIG. 33 is a schematic of an example of a data structure of an operation log of the ISP;

DESCRIPTION OF EMBODIMENTS

Preferred embodiments of the present invention will be explained with reference to accompanying drawings. The embodiments are not intended to limit the scope of the present invention in any way.

[a] First Embodiment

Figure 1:
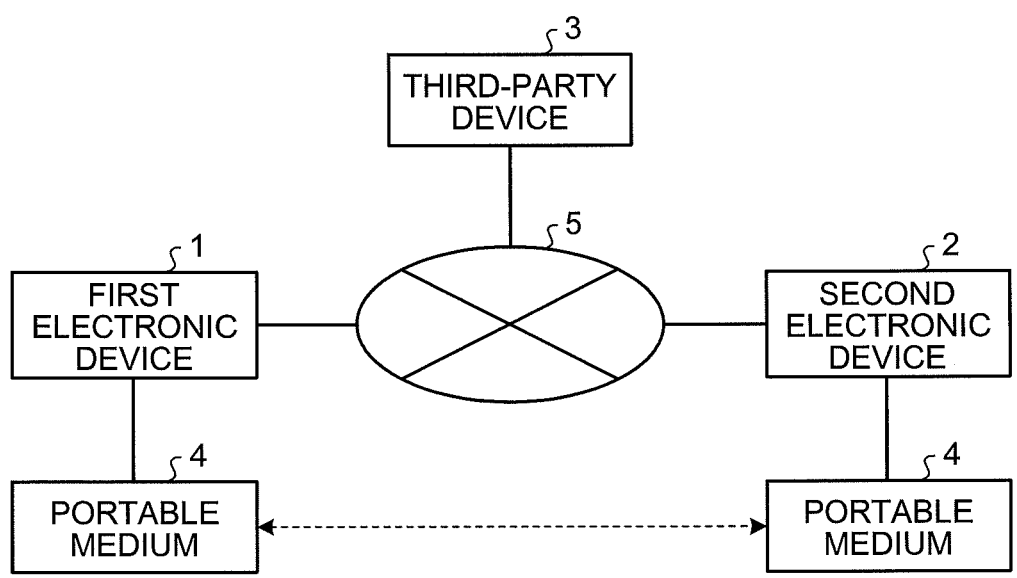
FIG. 1 is a schematic of a configuration of a system according to a first embodiment of the present invention.

FIG. 1 is a schematic of a configuration of a system according to a first embodiment of the present invention. As illustrated in FIG. 1, this system includes a first electronic device 1, a second electronic device 2, and a third-party device 3.

The first electronic device 1 stores first configuration information of the first electronic device 1 collected by a tamper-resistant chip mounted on the first electronic device 1 and approved by the third-party device 3 in a portable medium 4.

The second electronic device 2 stores second configuration information of the second electronic device 2 collected by a tamper-resistant chip mounted on the second electronic device 2 and approved by the third-party device 3 in the portable medium 4. The second electronic device 2 also acquires the first configuration information from the portable medium 4.

The first electronic device 1 transmits the first configuration information of the first electronic device 1 and the second configuration information of the second electronic device 2 acquired from the portable medium 4 to the second electronic device 2 over a long-distance network 5.

The second electronic device 2 controls connection between the first electronic device 1 and the second electronic device 2 over the long-distance network 5 based on the first configuration information and the second configuration information received from the first electronic device 1.

Advantageous effects achieved by the system according to the first embodiment will now be explained. The first electronic device 1 stores the first configuration information approved by the third-party device in the portable medium 4, and the second electronic device 2 acquires the first configuration information of the first electronic device 1 from the portable medium 4. The second electronic device 2 stores the second configuration information approved by the third-party device 3, and the first electronic device 1 acquires the second configuration information of the second electronic device 2 from the portable medium 4. The second electronic device 2 then controls connection between the first electronic device 1 and the second electronic device 2 over the long-distance network 5 using the first configuration information and the second configuration information that can only be known to these electronic devices to be connected having exchanged such information using the portable media 4. Therefore, the system according to the first embodiment allows connection to be established to an appropriate destination when connection is to be established between devices over a long-distance network.

[b] Second Embodiment

An example of a technology of the Trusted Computing Group (TCG) used in a second embodiment of the present invention will now be explained. Terminals and devices connected to the Internet are constantly exposed to security threats, and the structures of software implemented on a platform could be modified unexpectedly by a virus and spyware, as well as by other malicious scripts, unauthorized accesses, and the like. To protect against such risks, the TCG allows a secure computing environment to be established by ensuring reliability of a platform. A platform herein means hardware, an operating system (OS), applications, and the like.

Conventional security countermeasures that are dependent only on software provide only limited protection against threats of software tampering, for example. Therefore, according to a TCG specification, a trusted platform module (TPM) chip is embedded in a platform to achieve a situation making tampering extremely difficult using the TPM chip as the root of trust, to enable tampering to be reliably detected in case any occurs, and to enable an appropriate remedy to be applied so that a reliable computing environment can be established. Furthermore, by using a TPM chip, a hardware-based protection of data/certification and secure encryption environment can be realized.

A TPM chip will now be explained. A TPM chip is a tamper resistant hardware chip that is bound to an electronic device. A TPM chip is physically bound to a main component of the electronic device so that the chip cannot be removed from the electronic device. The main component of an electronic device corresponds to a mother board, for example. Because TPM chips are designed to have limited functional implementations, memory areas, and processor powers, the TPM chips can be manufactured at a low cost, and can be used in various types of electronic devices and platforms.

For example, functions of a TPM include functions for generating and storing a Rivest Shamir Adleman (RSA) private key, and functions for providing a signature, encryption, and decryption using the RSA private key. According to the RSA, a pair of a private key and a public key is generated. Functions of the TPM also include a function for performing a hashing operation of the Secure Hash Algorithm 1 (SHA-1), and functions for collecting and maintaining environmental information of the electronic device. At each sequential step of a booting process of a Basic Input/Output System (BIOS), an OS loader, an OS kernel, or the like in a phase of starting the electronic device to which the TPM is bound, the TPM measures a particular part of each of these software codes following a predetermined scheme, hashes the software code thus measured, and registers the result in a register internal to the TPM. The TPM also collects the hardware information of the electronic device to which the TPM is bound, hashes code information associated with the hardware following a predetermined scheme, and registers the result to the register internal to the TPM. In the explanation below, the software codes and the hardware information are collectively referred to as configuration information, as appropriate. When the TPM transmits the configuration information in response to an external request, the TPM appends an electronic signature that is based on a key maintained internal to the TPM to the information to be transmitted, before transmitting the information. In the explanation below, the term "configuration information" means information representing a combination of the configuration information and the electronic signature.

The TCG specifies a software stack and software interfaces for allowing upper layer applications or libraries to use the TPM chip that is a hardware device. The software stack is called TCG Software Stack (TSS), and includes software modules storing therein the functions of the TPM chip with limited resources. An application running on the electronic device can access the functions of the TPM chip using an interface provided by the TSS.

A configuration of the system according to the second embodiment will now be explained. In the second embodiment, explained below is an example assuming a situation in which a maintenance person performs a maintenance task on a wireless LAN router or different types of devices connected to the wireless LAN router using a mobile terminal. The electronic device used by the maintenance person is not limited to a mobile terminal. For example, the electronic device used by the maintenance person may be a plurality of electronic devices, or a stationary electronic device. In the explanation below, these types of electronic devices are represented by a mobile terminal.

To begin with, the maintenance person stores information of the mobile terminal to be used by the maintenance person in an integrated circuit (IC) card. The portable medium used by the maintenance person is not limited to an IC card. For example, the portable medium may be a universal serial bus (USB) memory or a hard disk. Before storing information of the IC card in the mobile terminal, or before storing information of the mobile terminal in the IC card, a third party approves the IC card for the exchange between the mobile terminal and the IC card. The IC card then provides the information thus approved to the mobile terminal. The mobile terminal provides information such as the configurations of the mobile terminal itself to the IC card, in a format including the information approved by the third party. The maintenance person then goes to the location where the device to be maintained is installed, and visits an administrator of the device. The administrator coming face to face with the maintenance person checks if the maintenance person is a trustworthy person. As a result of checking face in face with the person, if the maintenance person is a trustworthy person, the administrator gives permission to connect the IC card to the wireless LAN router. Once the connection of the IC card and the wireless LAN router is permitted, the information of the mobile terminal stored in the IC card is passed to the wireless LAN router, and the information of the wireless LAN router is stored in the IC card.

The maintenance person then brings back the IC card, connects the IC card to the mobile terminal and stores the information of the wireless LAN router in the mobile terminal, to complete setting up the connection configuration. Once the connection configuration setup is completed, the maintenance person establishes a secure connection between the mobile terminal to the wireless LAN router over a long-distance network such as the Internet and performs the maintenance task.

Figure 2:
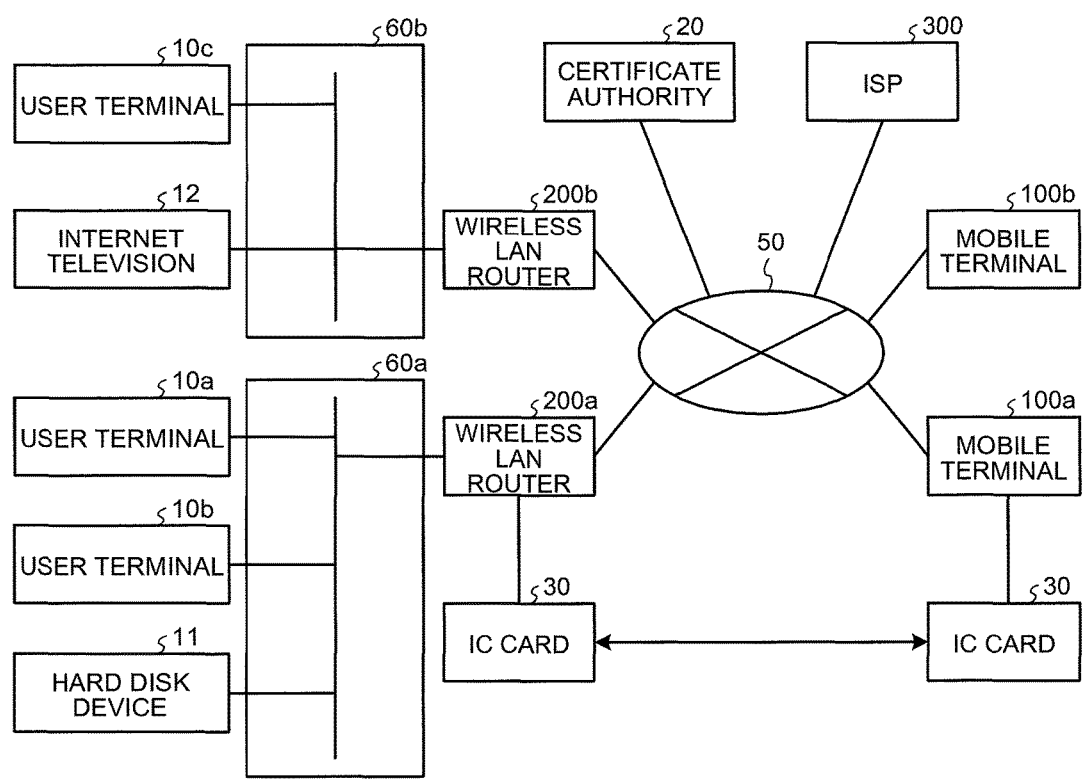
FIG. 2 is a schematic of a configuration of a system according to a second embodiment of the present invention.

FIG. 2 is a schematic of a configuration of the system according to the second embodiment. As illustrated in FIG. 2, user terminals 10a and 10b, and a hard disk device 11 are interconnected via a wireless LAN router 200a over a wireless LAN 60a.

A user terminal 10c and an Internet television are interconnected via a wireless LAN router 200b over a wireless LAN 60b. A certificate authority 20, mobile terminals 100a and 100b, the wireless LAN routers 200a and 200b, and an Internet services provider (ISP) 300 are interconnected over a network 50.

The maintenance person transports the information of the mobile terminal 100a to the wireless LAN router 200a, and transports the information of the wireless LAN router 200a to the mobile terminal 100a using a IC card 30. The maintenance person then inserts the IC card 30 into an interface on a mobile terminal 100, and connects the IC card 30 to the mobile terminal 100. The maintenance person also inserts the IC card 30 into an interface on a wireless LAN router 200, and connects the IC card 30 to the wireless LAN router 200. Alternatively, the maintenance person may use an IC card reader or the like to connect the IC card 30 to the mobile terminal 100a and the wireless LAN router 200a. The IC card 30 may also be connected to the mobile terminal 100a and the wireless LAN router 200a using other known technologies. A TPM chip is mounted on the IC card 30.

The user terminals 10a, 10b, and 10c are terminal devices such as personal computers (PCs) used by a user. The hard disk device 11 is an external storage device used by the user terminals 10a, 10b, and the like. The Internet television 12 is a television allowing video programs to be watched using a service provided on the Internet over an Internet connection.

The certificate authority 20 is a device that issues a public key or a digital certificate of a public key used by the mobile terminals 100a and 100b, the wireless LAN routers 200a and 200b, and the ISP 300. In the second embodiment, secure data communication is established between the devices using the mechanism of the public-key infrastructure (PKI). For example, the certificate authority 20 maintains the public key of the IC card 30, the public keys of the mobile terminals 100a and 100b, the public keys of the wireless LAN routers 200a and 200b, and the public key of the ISP 300. The mobile terminals 100a and 100b, the wireless LAN routers 200a and 200b, the ISP 300, and the IC card 30 acquire these public keys from the certificate authority 20.

The mobile terminals 100a and 100b are terminal devices used by the maintenance person in performing a maintenance task, for example. In the explanation below, the mobile terminals 100a and 100b are collectively referred to as a mobile terminal 100, as appropriate. A TPM chip is mounted on the mobile terminal 100.

The wireless LAN routers 200a and 200b are devices that relay data communication between each of the devices connected to the wireless LAN and the network 50. In the explanation below, the wireless LAN routers 200a and 200b are collectively referred to as a wireless LAN router 200, as appropriate. A TPM chip is mounted on the wireless LAN router 200.

The ISP 300 acquires the configuration information of the mobile terminal 100 from the TPM chip on the mobile terminal 100, and validates the electronic signature included in the configuration information. After confirming that the configuration information is not tampered, the ISP 300 analyzes the configuration information and gives an approval to the mobile terminal 100. The ISP 300 also acquires the configuration information of the wireless LAN router 200 from the TPM chip on the wireless LAN router 200, and validates the electronic signature included in the configuration information. After confirming that the configuration information is not tampered, the ISP 300 analyzes the configuration information and gives an approval to the wireless LAN router. The ISP 300 also acquires the configuration information of the IC card 30 from TPM chip on the IC card 30 and gives an approval to the IC card.

Figure 3:
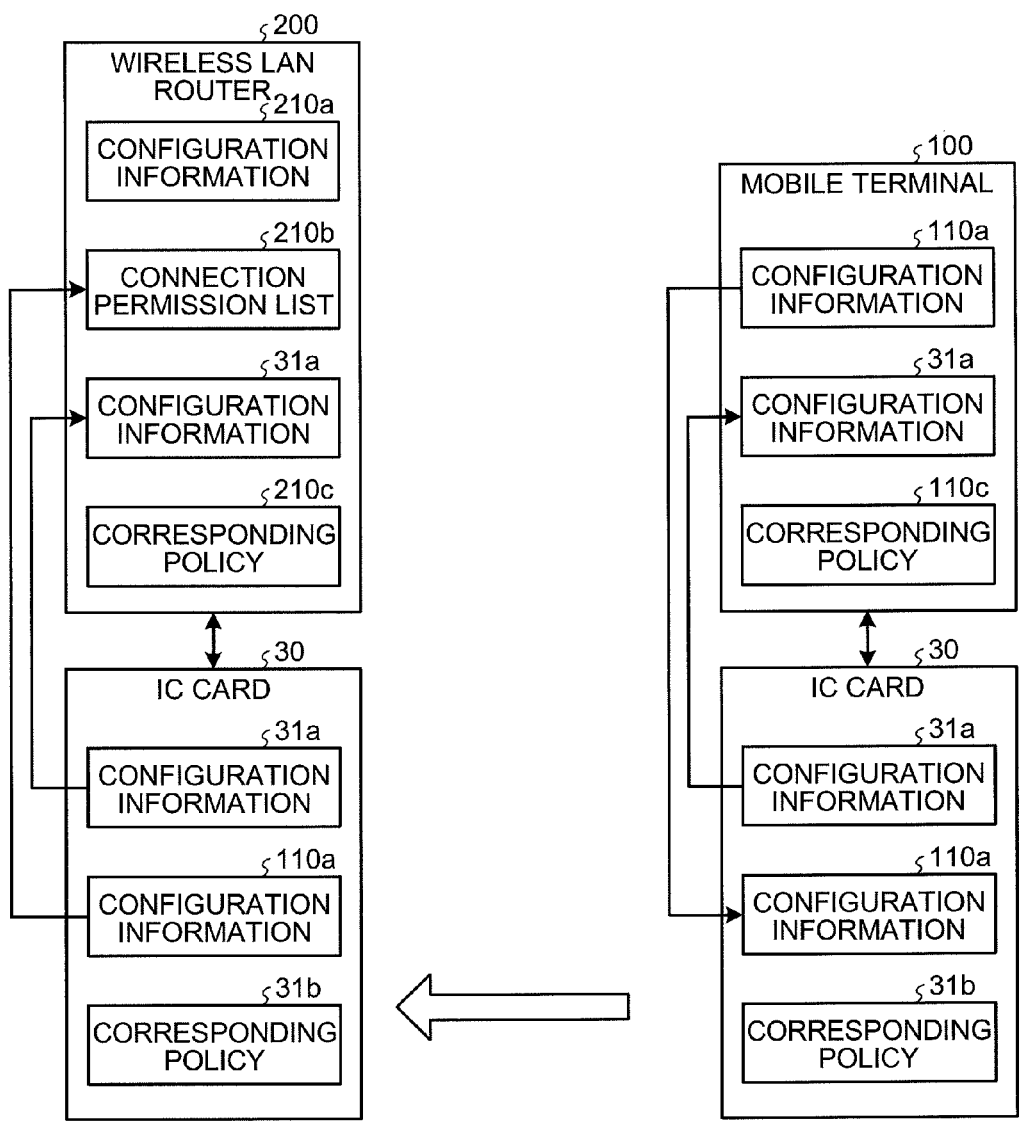
FIG. 3 is a first schematic for explaining data exchanged between an IC card, a mobile terminal, and a wireless LAN router.
Figure 4:
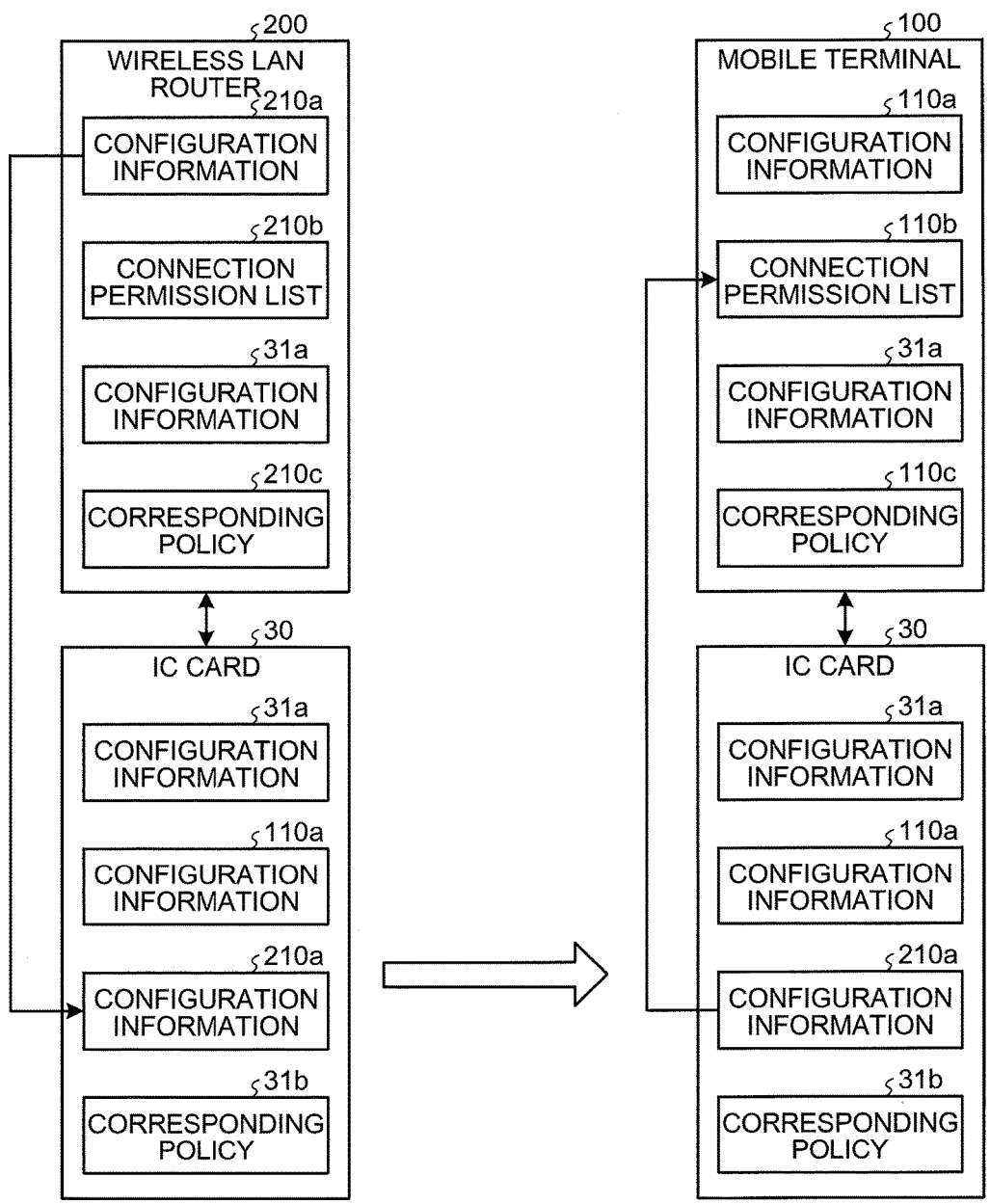
FIG. 4 is a second schematic for explaining the data exchanged between the IC card, the mobile terminal, and the wireless LAN router.

The data exchanged between the IC card 30, the mobile terminal 100, and the wireless LAN router 200 illustrated in FIG. 2 will now be explained. FIGS. 3 and 4 are schematics for explaining the data exchanged between the IC card, the mobile terminal, and the wireless LAN router.

At a stage before any data is exchanged, the IC card 30 has configuration information 31a and a corresponding policy 31b for the IC card 30. The mobile terminal 100 has configuration information 110a and a corresponding policy 110c for the mobile terminal 100. The wireless LAN router 200 has configuration information 210a and a corresponding policy 210c for the wireless LAN router 200. Each of these pieces of information illustrated in FIG. 3 will be explained later.

In FIG. 3, when the mobile terminal 100 and the IC card 30 are approved by the ISP 300, the mobile terminal 100 and the IC card 30 are connected. The configuration information 31a of the IC card 30 is then registered to the mobile terminal 100, and the configuration information 110a of the mobile terminal 100 is registered to the IC card 30.

The maintenance person carries the IC card 30 to a place where the wireless LAN router 200 is installed. Once the wireless LAN router 200 and the IC card 30 are approved by the ISP 300, the wireless LAN router 200 and the IC card 30 are connected. The configuration information 31a of the IC card 30 is then registered to the wireless LAN router. The configuration information 110a of the mobile terminal 100 is registered to the wireless LAN router 200 as a connection permission list 210b.

In FIG. 4, the configuration information 210a of the wireless LAN router 200 is registered to the IC card 30. The maintenance person carries back the IC card 30 to the place where the mobile terminal 100 is deployed. When the mobile terminal 100 and the IC card 30 are approved again by the ISP 300, the configuration information 210a of the wireless LAN router 200 is registered to the mobile terminal 100 as a connection permission list 110b.

As illustrated in FIGS. 3 and 4, the maintenance person carries the information using IC card 30, and allows the configuration information 110a, the connection permission list 110b, the configuration information 31a, and the corresponding policy 110c to be registered to the mobile terminal 100. To the wireless LAN router 200, the configuration information 210a, the connection permission list 210b, the configuration information 31a, and the corresponding policy 110c are registered.

Figure 5:
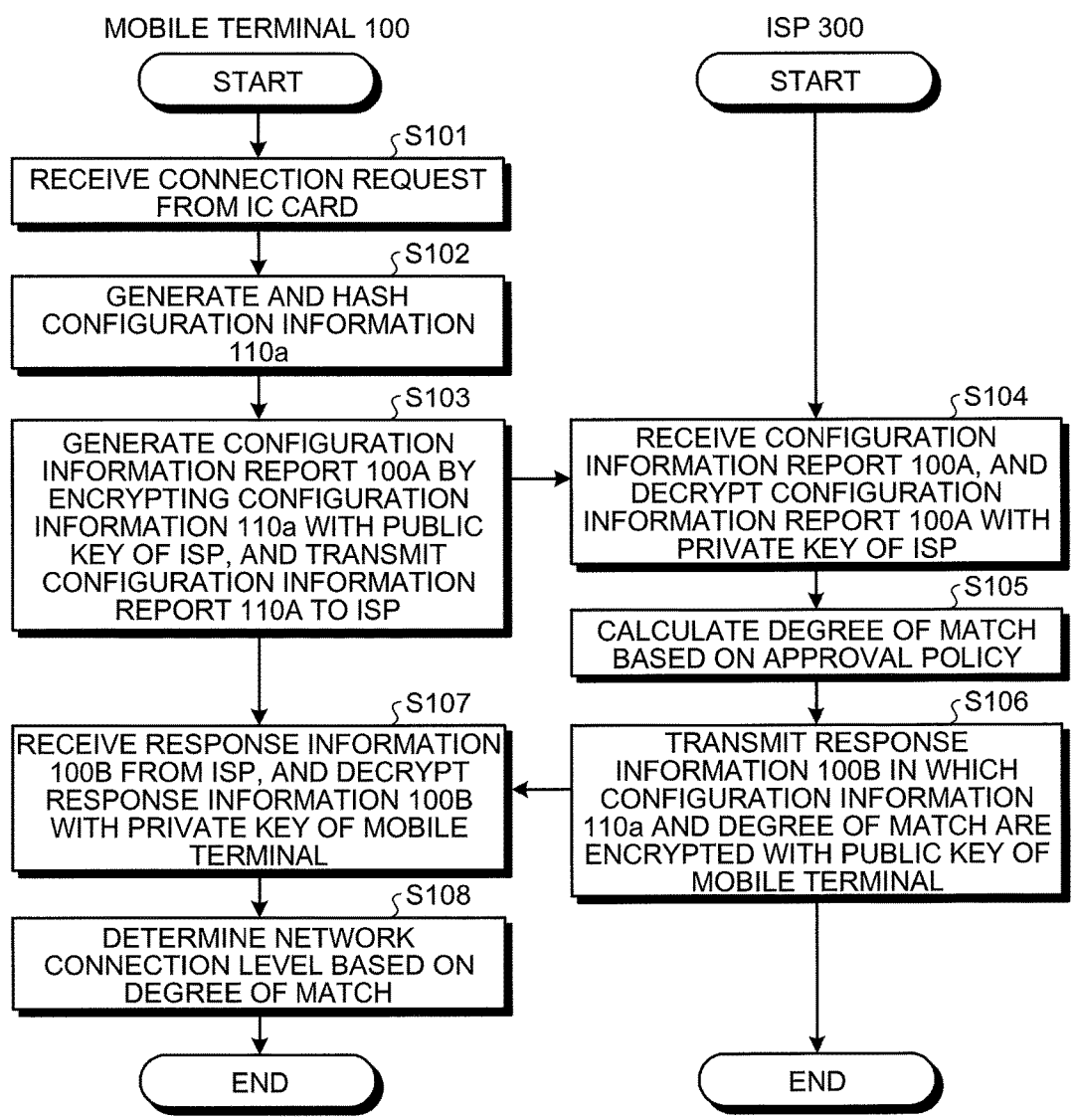
FIG. 5 is a flowchart illustrating a process performed by the mobile terminal and an ISP.

A process performed by the mobile terminal 100 and the ISP 300 when the mobile terminal 100 is to receive an approval of the ISP 300 will now be explained specifically. FIG. 5 is a flowchart illustrating the process performed by the mobile terminal and the ISP. As illustrated in FIG. 5, the mobile terminal 100 receives a connection request from the IC card 30 (Step S101).

The mobile terminal 100 generates and hashes the configuration information 110a of the mobile terminal 100 (Step S102). At this time, the mobile terminal 100 may generate an electronic signature using a key retained on the TPM on the mobile terminal 100, and append the electronic signature to the hash. The mobile terminal 100 generates a configuration information report 100A by encrypting the hashed configuration information 110a using the public key of the ISP 300 and transmits the configuration information report 100A to the ISP 300 (Step S103).

The ISP 300 receives the configuration information report 100A and decrypts the configuration information report 100A using a private key of the ISP 300 (Step S104). At this time, the ISP 300 may validate that the hash is not tampered, by acquiring the public key that is paired with the signature key retained on the TPM of the mobile terminal 100, and validating the electronic signature. The ISP 300 calculates a degree of match based on the configuration information 110a and a approval policy (Step S105). The approval policy herein means a policy for giving an approval to an electronic device based on the configuration information. An electronic device having a higher degree of match is determined to be more trustworthy than an electronic device having a lower degree of match. The leveling policy will be explained later in detail.

The ISP 300 transmits response information 100B that is the degree of match with the configuration information 110a encrypted with the public key of the mobile terminal 100 (Step S106). The mobile terminal 100 receives the response information 100B from the ISP 300 and decrypts the response information 100B using the private key of the mobile terminal 100 (Step S107). The mobile terminal 100 determines a network connection level based on the degree of match (Step S108). The process of determining the network connection level performed by the mobile terminal 100 will be described later.

Figure 6:
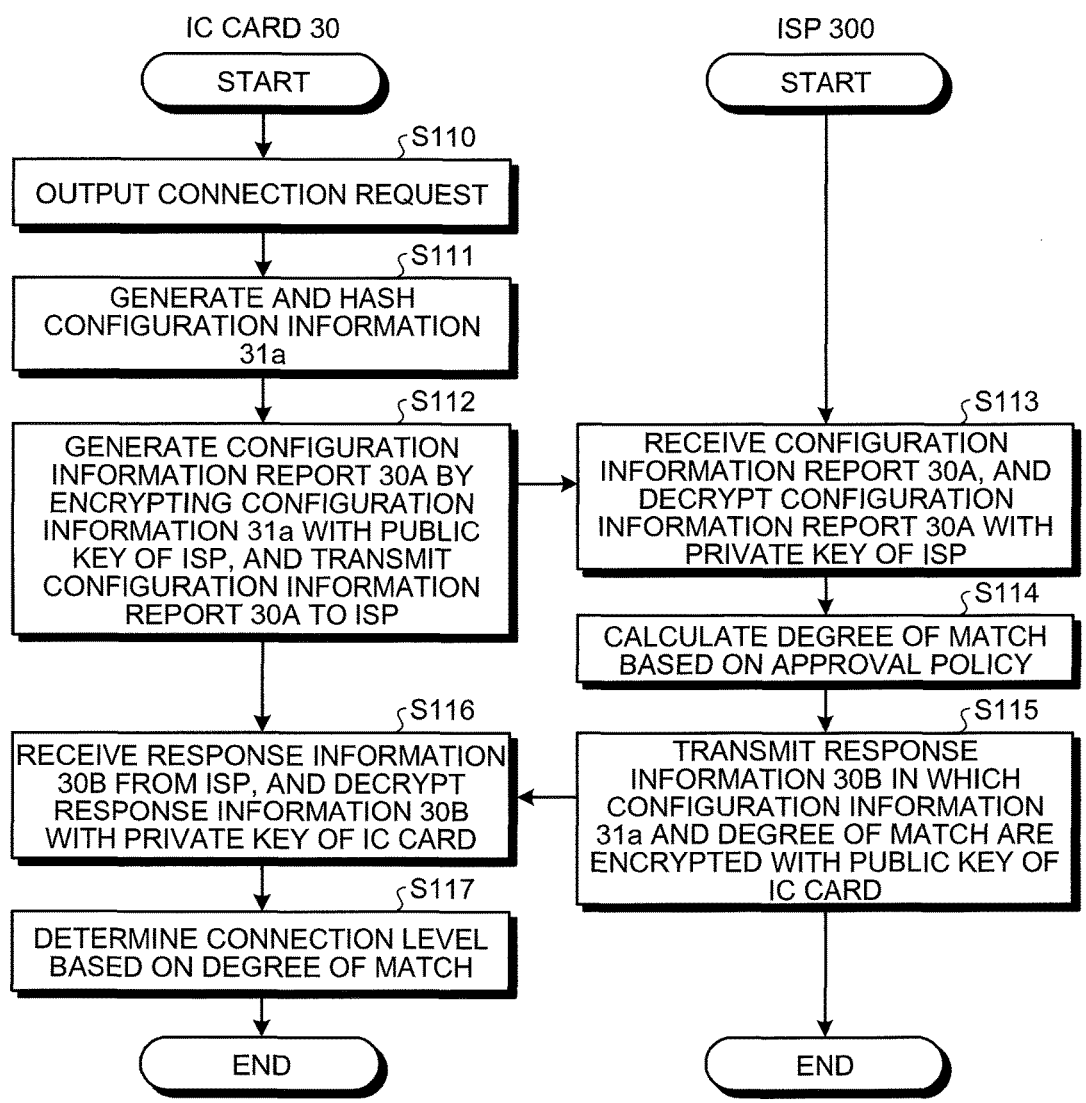
FIG. 6 is a flowchart illustrating a process performed by the IC card and the ISP.

A processes performed by the IC card 30 and the ISP 300 when the IC card 30 is to receive an approval of the ISP 300 will now be explained specifically. FIG. 6 is a flowchart illustrating a process performed by the IC card and the ISP. As illustrated in FIG. 6, the IC card 30 outputs a connection request (Step S110).

The IC card 30 generates and hashes the configuration information 31a (Step S111). The IC card 30 generates a configuration information report 30A by encrypting the hashed configuration information 31a using the public key of the ISP 300 and transmits the configuration information report 30A to the ISP 300 (Step S112).

The ISP 300 receives the configuration information report 30A and decrypts the configuration information report 30A using the private key of the ISP 300 (Step S113). The ISP 300 calculates a degree of match based on the configuration information 31a and the approval policy (Step S114).

The ISP 300 transmits response information 30B that is the degree of match with the configuration information 31a encrypted with the public key of the IC card 30 (Step S115). The IC card 30 receives the response information 30B from the ISP 300 and decrypts the response information 30B using the private key of the IC card 30 (Step S116). The IC card 30 determines a connection level based on the degree of match (Step S117). The process of determining the connection level performed by the IC card 30 will be described later.

After performing the process illustrated in FIG. 5, the mobile terminal 100 determines if the network connection level is permitted to be executed based on the corresponding policy 110c. The corresponding policy 110c is a policy that indicates network connection levels permitted to the mobile terminal 100.

After executing the process illustrated in FIG. 6, the IC card 30 determines if the connection level is permitted to be executed based on the corresponding policy 31b. The corresponding policy 31b is a policy that indicates connection levels permitted to the IC card 30.

Figure 7:
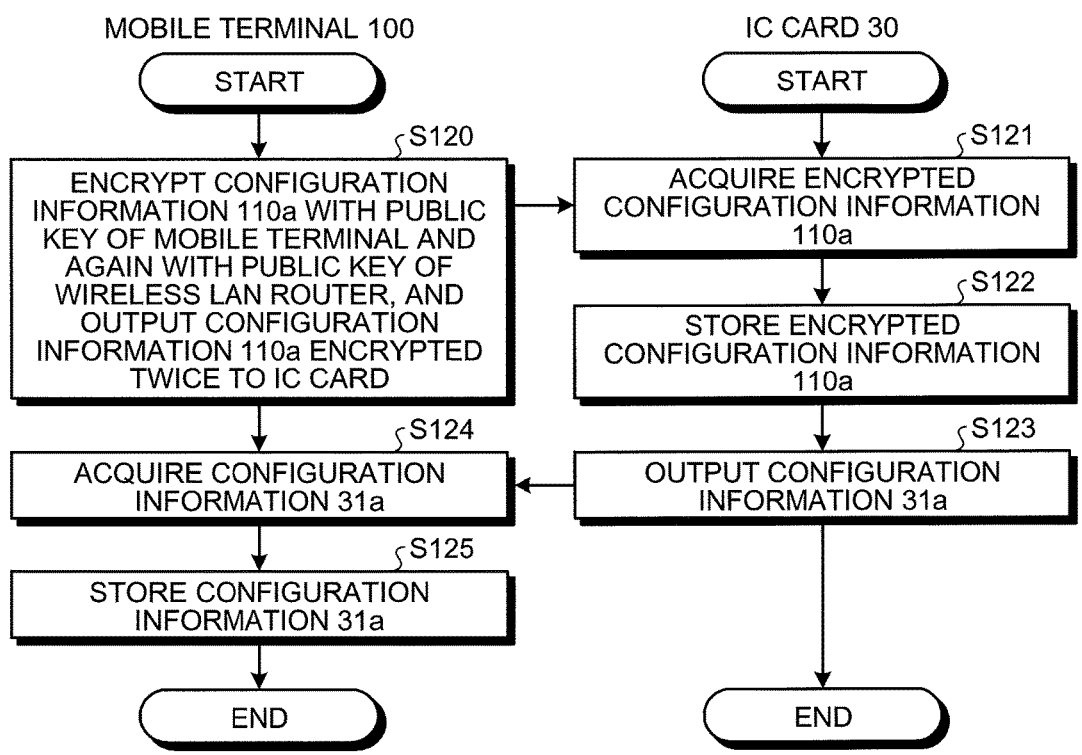
FIG. 7 is a first flowchart illustrating a process of exchanging data between the mobile terminal and the IC card.

If the network connection level of the mobile terminal 100 is permitted to be executed based on the corresponding policy 110c, and the connection level of the IC card 30 is permitted to be executed based on the corresponding policy 31b, the process illustrated in FIG. 7 is executed.

FIG. 7 is a first flowchart illustrating a process of exchanging data between the mobile terminal and the IC card. As illustrated in FIG. 7, the mobile terminal 100 encrypts the configuration information 110a using the public key of the mobile terminal 100, encrypts the configuration information 110a again using the public key of the wireless LAN router, and outputs the configuration information 110a encrypted twice to the IC card 30 (Step S120).

The IC card 30 acquires the configuration information 110a thus encrypted (Step S121) and stores therein the configuration information 110a thus encrypted (Step S122). The IC card 30 outputs the configuration information 31a to the mobile terminal 100 (Step S123).

The mobile terminal 100 acquires the configuration information 31a (Step S124) and stores therein the configuration information 31a (Step S125).

Figure 8:
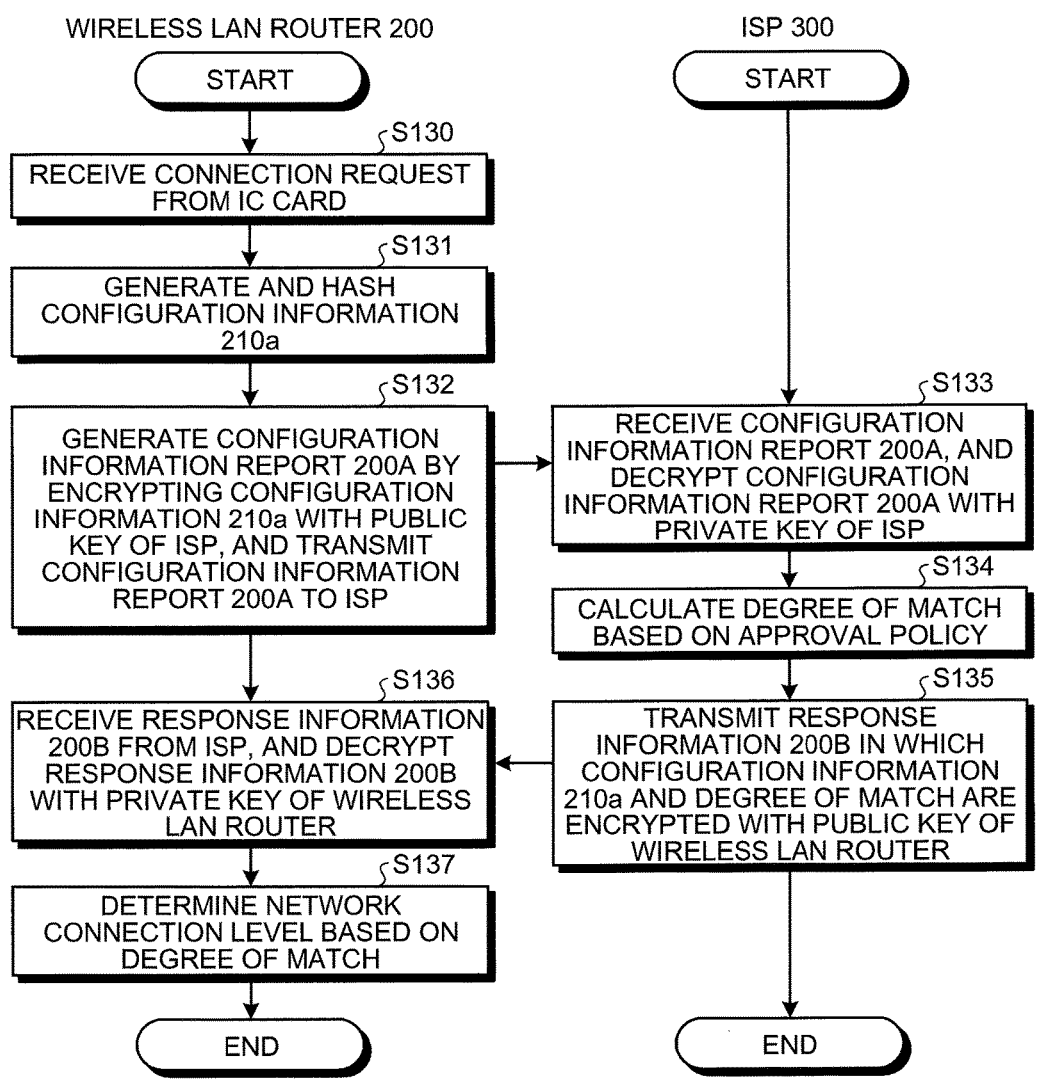
FIG. 8 is a flowchart illustrating a process performed by the wireless LAN router and the ISP.

A process performed by the wireless LAN router 200 and the ISP 300 when the wireless LAN router 200 is to receive an approval of the ISP 300 will now be explained specifically. FIG. 8 is a flowchart illustrating the process performed by the wireless LAN router and the ISP. As illustrated in FIG. 8, the wireless LAN router 200 receives a connection request from the IC card 30 (Step S130).

The wireless LAN router 200 generates and hashes the configuration information 210a of the wireless LAN router 200 (Step S131). The wireless LAN router 200 generates a configuration information report 200A by encrypting the hashed configuration information 210a using the public key of the ISP 300 and transmits the configuration information report 200A to the ISP 300 (Step S132).

The ISP 300 receives the configuration information report 200A and decrypts the configuration information report 200A using the private key of the ISP 300 (Step S133). The ISP 300 calculates the degree of match based on the configuration information 210a and the approval policy (Step S134).

The ISP 300 transmits response information 200B which is the configuration information 210a and the degree of match encrypted with the public key of the wireless LAN router 200 (Step S135). The wireless LAN router 200 receives the response information 200B from the ISP 300 and decrypts the response information 200B using the private key of the wireless LAN router 200 (Step S136). The wireless LAN router 200 determines a network connection level based on the degree of match (Step S137). The process of determining a network connection level performed by the wireless LAN router 200 will be described later.

Before connection is to be established between the IC card 30 and the wireless LAN router 200, the IC card 30 receives an approval from the ISP 300 again. Because the process of receiving an approval from the ISP 300 performed by the IC card 30 is the same as that illustrated in FIG. 6, the explanation thereof is omitted herein.

After executing the process illustrated in FIG. 8, the wireless LAN router 200 determines if the network connection level is permitted to be executed based on the corresponding policy 210c. The corresponding policy 210c is a policy that indicates network connection levels permitted to the wireless LAN router 200.

After executing the process illustrated in FIG. 6, the IC card 30 determines if the connection level is permitted to be executed on the wireless LAN router 200, based on the corresponding policy 31b.

Figure 9:
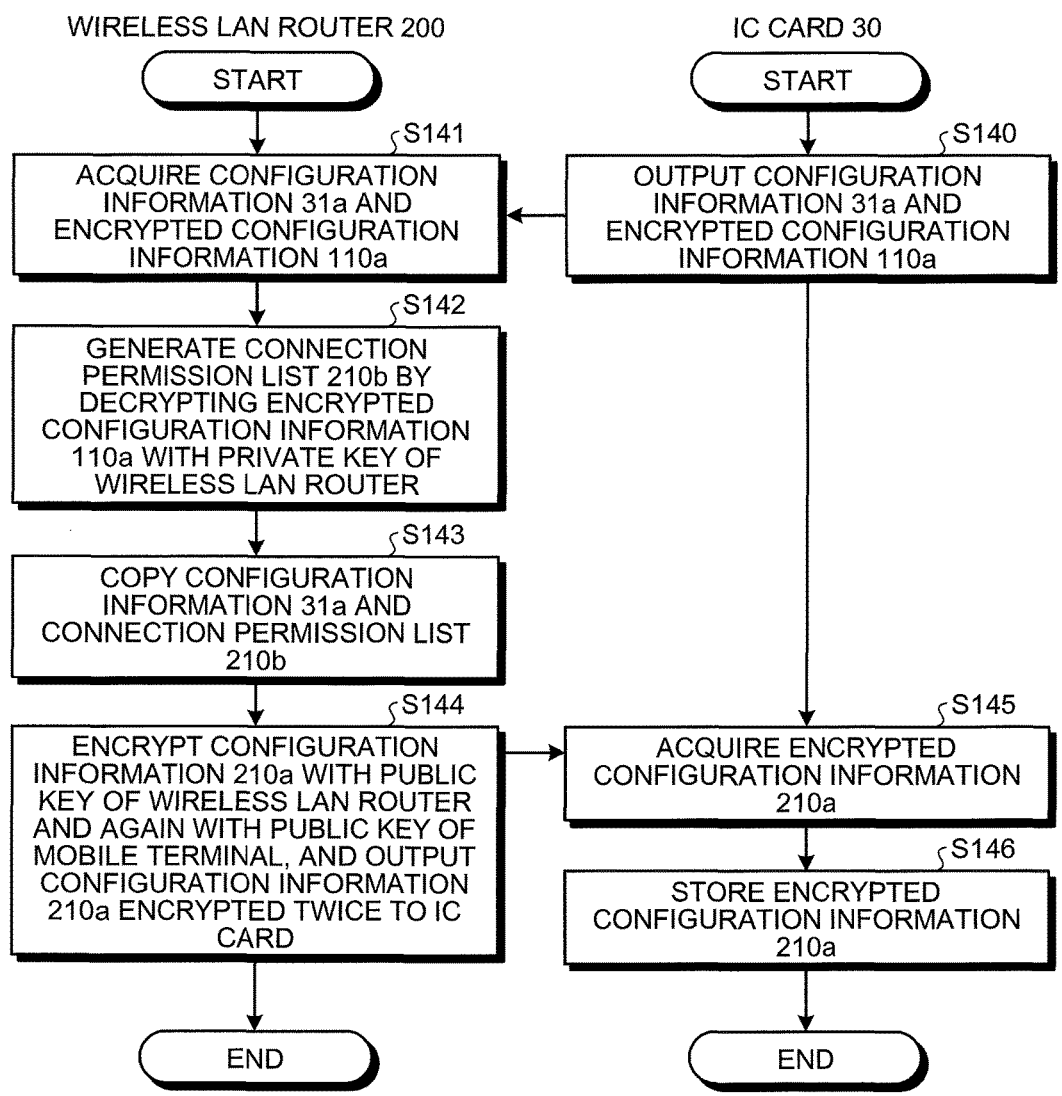
FIG. 9 is a flowchart illustrating a process of exchanging data between the wireless LAN router and the IC card.

If the network connection level of the wireless LAN router 200 is permitted to be executed based on the corresponding policy 210c, and the connection level of the IC card 30 is permitted to be executed based on the corresponding policy 31b, the process illustrated in FIG. 9 is executed.

FIG. 9 is a flowchart illustrating a process of exchanging data between the wireless LAN router and the IC card. As illustrated in FIG. 9, the IC card 30 outputs the configuration information 31a and the encrypted configuration information 110a to the wireless LAN router 200 (Step S140).

The wireless LAN router 200 acquires the configuration information 31a and the encrypted configuration information 110a (Step S141). The wireless LAN router 200 generates the connection permission list 210b by decrypting the encrypted configuration information 110a using the private key of the wireless LAN router 200 (Step S142).

The wireless LAN router 200 copies the configuration information 31a and the connection permission list 210b (Step S143). The wireless LAN router 200 encrypts the configuration information 210a using the public key of the wireless LAN router 200, encrypts the configuration information 210a again using the public key of the mobile terminal 100, and outputs the configuration information 210a encrypted twice to the IC card 30 (Step S144).

The IC card 30 then acquires the encrypted configuration information 210a (Step S145) and stores therein the encrypted configuration information 210a (Step S146).

When the process illustrated in FIG. 9 is performed and the configuration information 210a is stored in the IC card 30, the maintenance person carries back the IC card 30, and connects the IC card 30 to the mobile terminal 100. When connection is to be established between the mobile terminal 100 and the IC card 30, the processes illustrated in FIGS. 5 and 6 are performed again to receive an approval from the ISP 300 for the mobile terminal 100 and the IC card 30. Once the approval is granted, data is exchanged between the mobile terminal 100 and the IC card 30.

Figure 10:
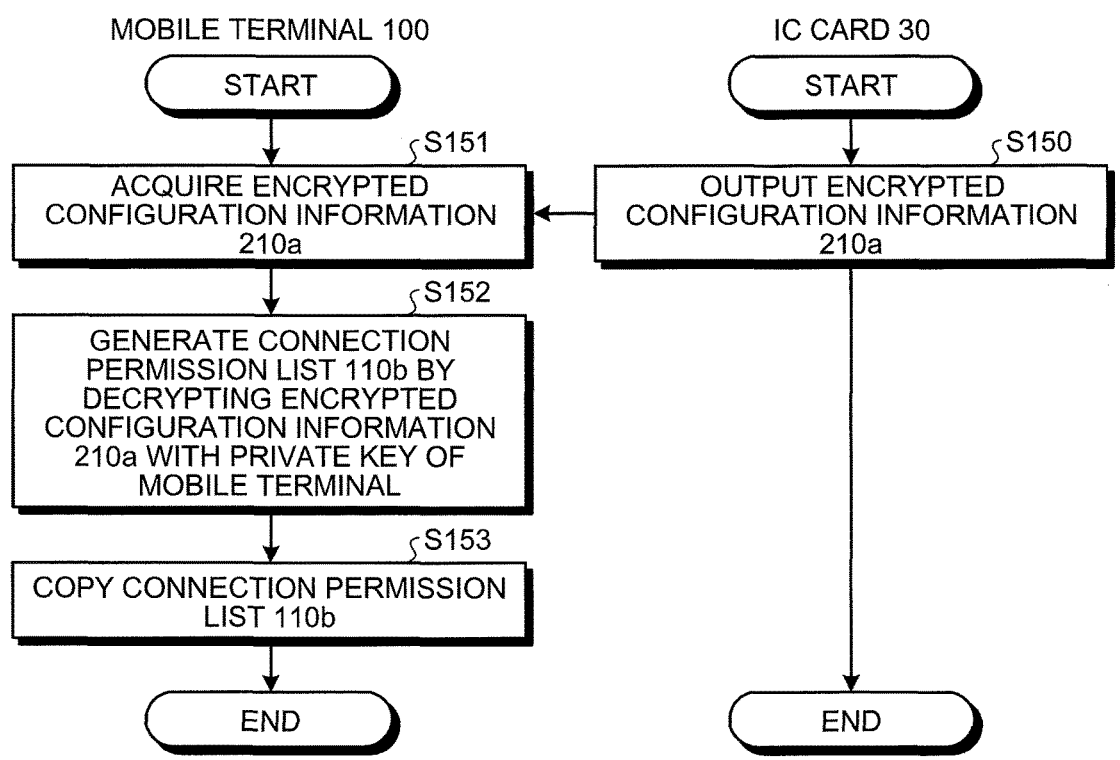
FIG. 10 is a second flowchart illustrating the process of exchanging data between the mobile terminal and the IC card.

FIG. 10 is a second flowchart illustrating the process of exchanging data between the mobile terminal and the IC card. As illustrated in FIG. 10, the IC card 30 outputs the encrypted configuration information 210a to the mobile terminal 100 (Step S150).

The mobile terminal 100 acquires the encrypted configuration information 210a (Step S151). The mobile terminal 100 generates the connection permission list 110b by decrypting the encrypted configuration information 210a using the private key of the mobile terminal 100 (Step S152). The mobile terminal 100 copies the connection permission list 110b (Step S153).

Preparations for establishing connection are completed by executing the processes illustrated in FIGS. 5 to 10. The configuration information 31a, the configuration information 110a, and the connection permission list 110b are stored in the mobile terminal 100. The configuration information 31a, the configuration information 210a, and the connection permission list 210b are stored in the wireless LAN router 200.

Figure 11:
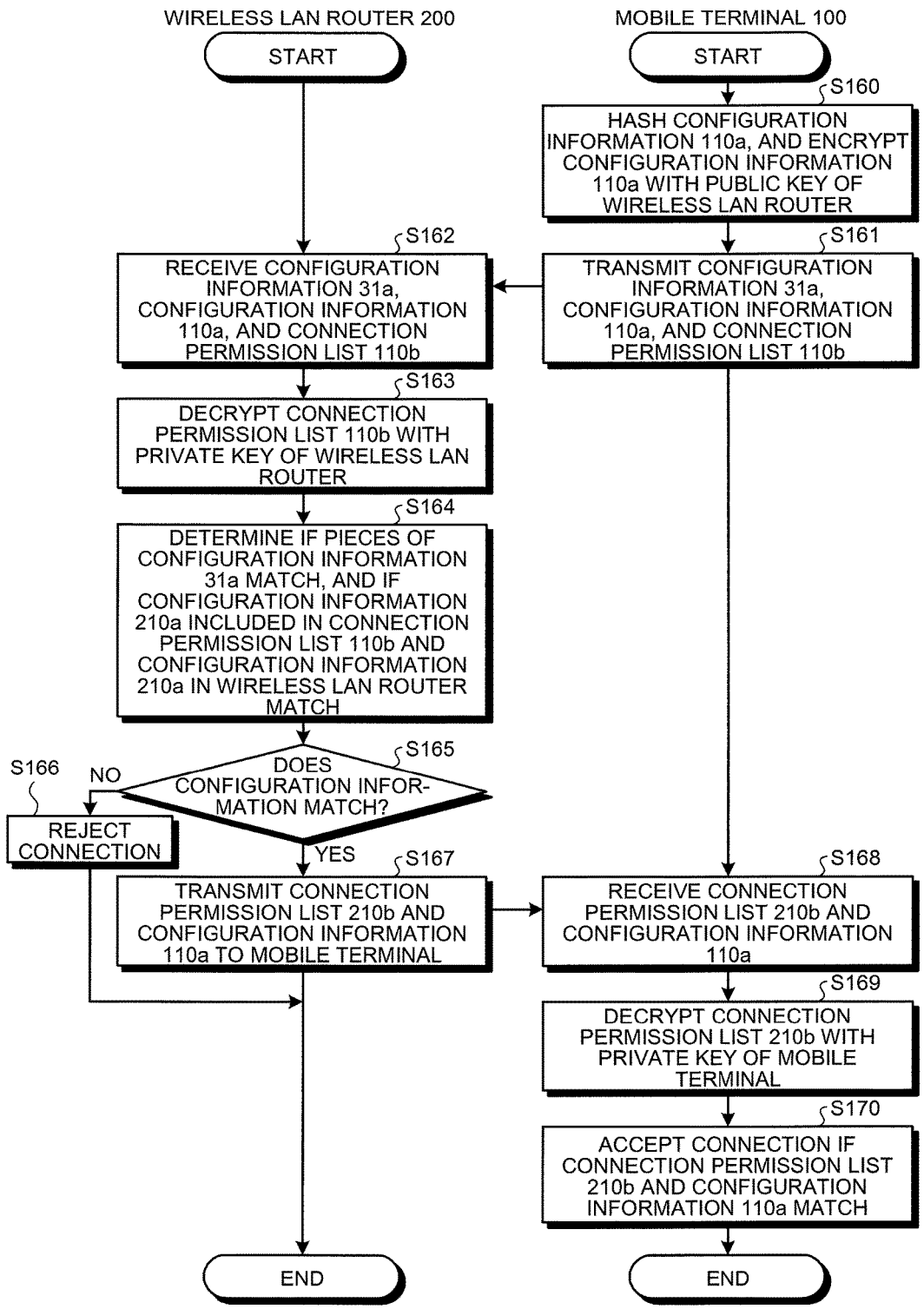
FIG. 11 is a first flowchart of a process of establishing a secure connection between the mobile terminal and the wireless LAN router.
Figure 12:
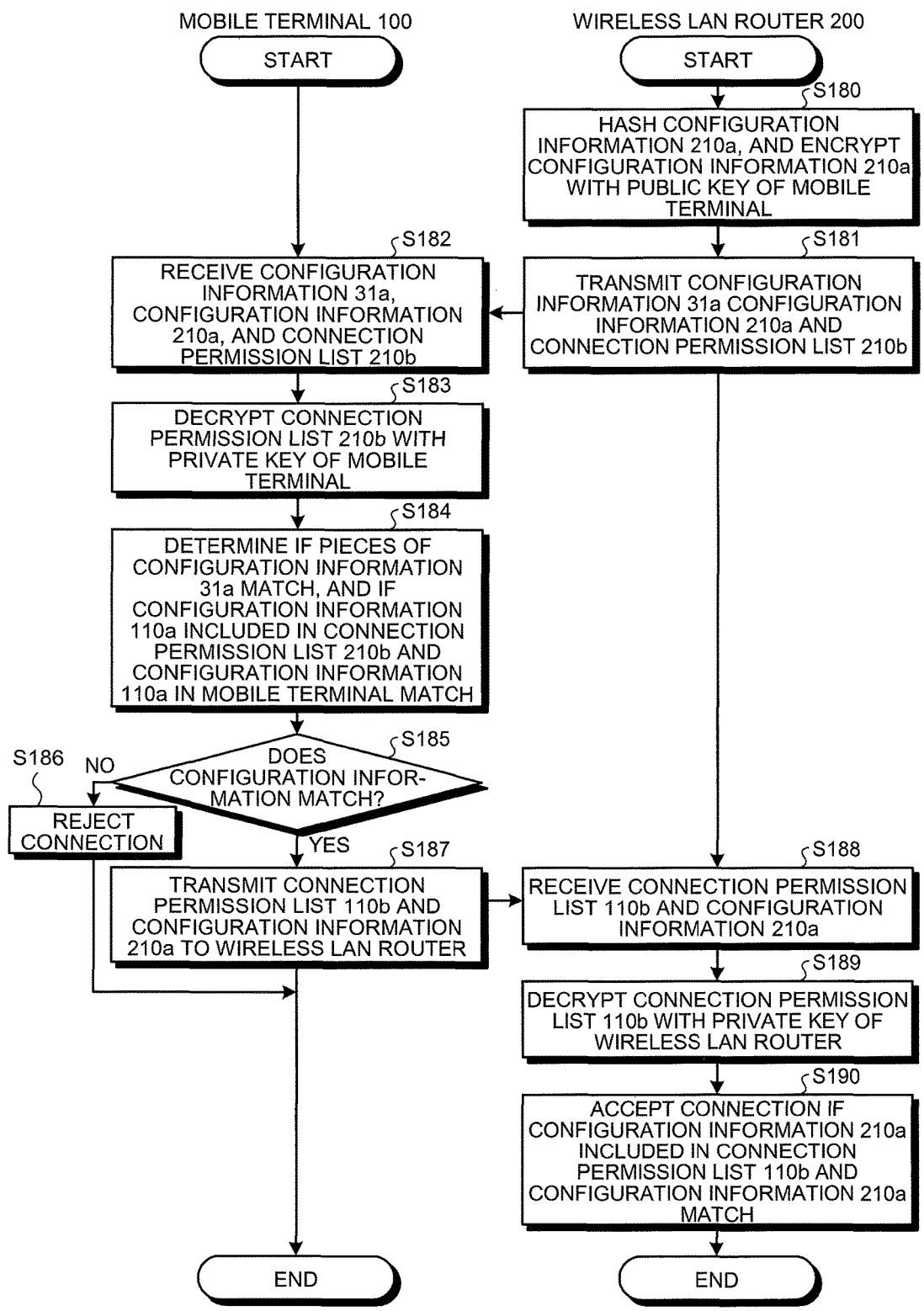
FIG. 12 is a second flowchart of another process of establishing a secure connection between the mobile terminal and the wireless LAN router.

Explained now is a process of establishing a secure connection between the mobile terminal 100 and the wireless LAN router 200 over the network 50 after the preparations for establishing connection is completed. FIGS. 11 and 12 are flowcharts of processes for establishing a secure connection between the mobile terminal and the wireless LAN router.

As illustrated in FIG. 11, the mobile terminal 100 hashes the configuration information 110a and encrypts the configuration information 110a with the public key of the wireless LAN router 200 (Step S160). The mobile terminal 100 transmits the configuration information 31a, the configuration information 110a, and the connection permission list 110b (Step S161). The connection permission list 110b is encrypted using the public key of the wireless LAN router 200.

The wireless LAN router 200 receives the configuration information 31a, the configuration information 110a, and the connection permission list 110b (Step S162). The wireless LAN router 200 decrypts the connection permission list 110b using the private key of the wireless LAN router 200 (Step S163).

The wireless LAN router 200 determines if a piece of the configuration information 31a matches the other piece of the configuration information 31a and if the configuration information 210a included in the connection permission list 110b matches the configuration information 210a in the wireless LAN router 200 (Step S164). One of the configuration information 31a matching the other piece of the configuration information 31a means the configuration information 31a received from the mobile terminal 100 matching the configuration information 31a stored in the wireless LAN router 200.

If these pieces of the configuration information do not match, or if the configuration information 210a included in the connection permission list 110b and the configuration information 210a on the wireless LAN router 200 do not match (No at Step S165), the wireless LAN router 200 rejects the connection (Step S166).

If these pieces of the configuration information 31a match and the configuration information 210a included in the connection permission list 110b and the configuration information 210a on the wireless LAN router 200 match (Yes at Step S165), the wireless LAN router 200 transmits the connection permission list 110b and the configuration information 110a to the mobile terminal 100 (Step S167). The connection permission list 210b is encrypted using the public key of the mobile terminal 100.

The mobile terminal 100 receives the connection permission list 210b and the configuration information 110a (Step S168). The mobile terminal 100 decrypts the connection permission list 210b using the private key of the mobile terminal 100 (Step S169). If the configuration information 110a included in the connection permission list 210b and the configuration information 110a match, the mobile terminal 100 accepts the connection (Step S170). The mobile terminal 100 may also notify the wireless LAN router 200 of the result of determination at Step S170.

As illustrated in FIG. 12, the wireless LAN router 200 hashes the configuration information 210a and encrypts the configuration information 210a using the public key of the mobile terminal 100 (Step S180). The wireless LAN router 200 then transmits the configuration information 31a, the configuration information 210a, and the connection permission list 210b (Step S181). The connection permission list 210b is encrypted using the public key of the mobile terminal 100.

The mobile terminal 100 receives the configuration information 31a, the configuration information 210a, and the connection permission list 210b (Step S182). The mobile terminal 100 then decrypts the connection permission list 210b using the private key of the mobile terminal 100 (Step S183).

The mobile terminal 100 determines if pieces of the configuration information 31a match and if the configuration information 110a included in the connection permission list 210b and the configuration information 110a on the mobile terminal 100 match (Step S184). These pieces of the configuration information 31a matching means the configuration information 31a received from the wireless LAN router 200 matching the configuration information 31a stored in the mobile terminal 100.

If these pieces of the configuration information 31a do not match, or if the configuration information 110a included in the connection permission list 210b and the configuration information 110a on the mobile terminal 100 do not match (No at Step S185), the mobile terminal 100 rejects the connection (Step S186).

If these pieces of the configuration information 31a match and the configuration information 110a included in the connection permission list 210b and the configuration information 110a on the mobile terminal 100 match (Yes at Step S185), the mobile terminal 100 transmits the connection permission list 110b and the configuration information 210a to the wireless LAN router 200 (Step S187). The connection permission list 110b is encrypted using the public key of the wireless LAN router 200.

The wireless LAN router 200 receives the connection permission list 110b and the configuration information 210a (Step S188). The wireless LAN router 200 decrypts the connection permission list 110b using the private key of the wireless LAN router 200 (Step S189). If the configuration information 210a included in the connection permission list 110b and the configuration information 210a match, the wireless LAN router 200 accepts the connection (Step S190). The wireless LAN router 200 may also notify the mobile terminal 100 of the result of determination at Step S190.

Figure 13:
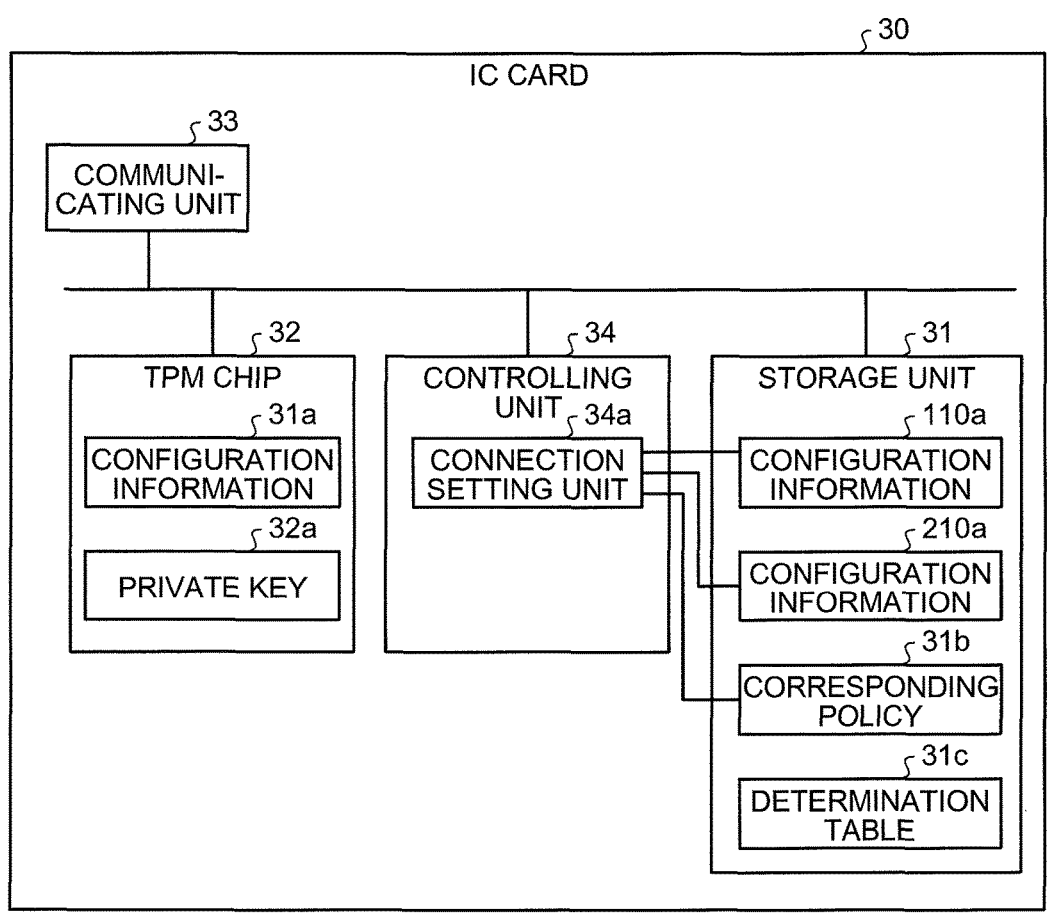
FIG. 13 is a functional block diagram illustrating a configuration of the IC card according to the second embodiment.

A configuration of the IC card 30 according to the second embodiment will now be explained. FIG. 13 is a functional block diagram illustrating the configuration of the IC card according to the second embodiment. As illustrated in FIG. 13, the IC card 30 includes a storage unit 31, a TPM chip 32, a communicating unit 33, and a controlling unit 34. Because the other units are the same as those included in a general IC card, the explanations thereof are omitted herein.

The storage unit 31 includes the configuration information 110a, configuration information 210a the corresponding policy 31b, and a determination table 31c. For example, the storage unit 31 corresponds to a storage device such as a random access memory (RAM) and a read-only memory (ROM), or a semiconductor memory device such as a flash memory.

The configuration information 110a is the configuration information 110a of the mobile terminal 100 acquired at Step S121 in FIG. 7. The configuration information 210a is the configuration information 210a of the wireless LAN router 200 acquired at Step S145 in FIG. 9.

The corresponding policy 31b is policy information describing processes that the IC card 30 is permitted to perform. FIG. 14 is a schematic of an example of data structure of the corresponding policy for the IC card. As illustrated in FIG. 14, the corresponding policy 31b includes Year, Month, and Date of Creation, Time of Creation, Policy, and Permissibility. The Year, Month, and Date of Creation indicates the year, the month, and the date at which the record is created. The Time of Creation indicates the time at which the record is created. The Policy describes details of a process performed using the IC card, for example. The Permissibility indicates if the process described in the Policy is permitted. For example, registered to the first line of the record in FIG. 14 is the information indicating that a process of "moving data to the IC card" is "permitted".

The determination table 31c is a table for determining a connection level. FIG. 15 is a schematic of an example of a data structure of the determination table for the IC card. As illustrated in FIG. 15, the determination table 31c retains Degree of Match and Connection Level in an associated manner. The Degree of Match is a value calculated by the ISP 300 based on the approval policy. For example, when the degree of match is "40", the ISP 300 gives permission for a connection level equal to or less than the degree of match of "40". For example, a connection level equal to or less than a degree of match of "40" includes "moving data to IC card", and "acquiring data from IC card". The corresponding policy 31b defines the extent by which the IC card 30 permits the connection levels permitted by the ISP 300.

The TPM chip 32 collects the configuration information of the IC card 30 when the IC card 30 is started. The TPM chip 32 hashes the configuration information thus collected and stores therein the configuration information as the configuration information 31a. The TPM chip 32 also stores therein a private key 32a. The private key 32a is the private key of the IC card 30.

FIG. 16 is a schematic of an example of a data structure of the configuration information stored in the TPM chip on the IC card. As illustrated in FIG. 16, the configuration information 31a includes Entry Number and Entry. For example, in the Entry with an Entry Number "1", configuration information corresponding to the device configuration portion of the IC card is stored in a hash format. For example, the portion corresponding to the device configuration corresponds to the model number, the serial number, and the like of the device.

The communicating unit 33 is a processing unit that connects to the mobile terminal 100, the wireless LAN router 200, and the like, and executes data communication with the mobile terminal and with the wireless LAN router. The communicating unit 33 also performs data communication with the certificate authority 20 and the ISP 300 via the mobile terminal 100 while the communicating unit 33 is connected to the mobile terminal 100. The communicating unit 33 may perform the data communication with the certificate authority 20 and the ISP 300 via a card reader having a communicating function.

The controlling unit 34 includes a connection setting unit 34a. The controlling unit 34 corresponds to an integrated device such as an application specific integrated circuit (ASIC) or a field programmable gate array (FPGA), for example. The controlling unit 34a also corresponds to an electric circuit such as a central processing unit (CPU) or a micro processing unit (MPU), for example.

When connection to the mobile terminal 100 is to be established, the connection setting unit 34a receives an approval by executing the process illustrated in FIG. 6 with the ISP 300, and executes the process illustrated in FIG. 7 with the mobile terminal 100. When connection to the wireless LAN router 200 to be established, the connection setting unit 34a receives an approval by executing the process illustrated in FIG. 6 with the ISP 300, and then executes the process illustrated in FIG. 8 with the wireless LAN router 200.

When the IC card 30 is to be connected to the mobile terminal 100 after being connected to the wireless LAN router 200, the connection setting unit 34a performs the process illustrated in FIG. 10 with the mobile terminal 100.

An example of the process performed by the connection setting unit 34a with the ISP 300 will now be explained. The connection setting unit 34a connects to the mobile terminal 100 and then acquires the configuration information 31a from the TPM chip 32. The connection setting unit 34a generates the configuration information report 30A by encrypting the configuration information 31a using the public key of the ISP 300 and transmits the configuration information report 30A to the ISP 300.

FIG. 17 is a schematic of an example of a data structure of the configuration information report 30A. As illustrated in FIG. 17, the configuration information report 30A includes Year, Month, and Date of Creation, Time of Creation, Device Created, Signature Information, and Configuration Information 1. Among these pieces of information, the Device Created includes identification information or the like of the IC card 30 having generated the configuration information report 30A. The Signature Information includes signature information C generated by the TPM chip 32. The information in the Configuration Information 1 corresponds to the configuration information 31a.

After transmitting the configuration information report 30A to the ISP 300, the connection setting unit 34a receives the encrypted response information 30B from the ISP 300. The connection setting unit 34a decrypts the response information 30B using the private key 32a of the TPM chip 32 and takes out the information representing the degree of match from the response information 30B.

A connection setting unit 34a compares the degree of match with the determination table 31c, and determines a connection level. The connection setting unit 34a compares the connection level thus determined with the corresponding policy 31b, and determines if the process at the connection level is a higher-level process than the process permitted by the corresponding policy 31b.

For example, the connection setting unit 34a may determine if the process at the connection level is a higher-level process than the process permitted by the corresponding policy 31b using the degree of match as a reference. For example, it is assumed herein that a process with a higher degree of match is a higher-level process in FIG. 15. For example, when the connection level is at "acquiring data from IC card", and the process permitted by the corresponding policy 31*b* is "moving data to IC card", the process of "acquiring data from IC card" at the connection level has a higher degree of match. In such a case, the connection setting unit 34*a* determines if the process at the connection level is higher than the process permitted by the corresponding policy 31*b*.

A process performed by the connection setting unit 34*a* when the IC card 30 connects to the mobile terminal 100, which is the example explained earlier with reference to FIG. 7, will now be explained. The connection setting unit 34*a* acquires the result of determining if a network connection level of the mobile terminal 100 is a process permitted by the corresponding policy 110*c* of the mobile terminal 100.

If the process at the connection level is a higher-level process than the process permitted by the corresponding policy 31*b*, and the process at the network connection level of the mobile terminal 100 is a higher-level process than the process permitted by the corresponding policy 110*c*, the connection setting unit 34*a* acquires the encrypted configuration information 110*a* from the mobile terminal 100 and stores therein the encrypted configuration information 110*a*. The connection setting unit 34*a* also outputs the configuration information 31*a* to the mobile terminal 100.

A process performed by the connection setting unit 34*a* when the IC card 30 connects to the wireless LAN router 200, which is the example explained earlier with reference to FIG. 9, will now be explained. The connection setting unit 34*a* acquires the result of determining if the network connection level of the wireless LAN router 200 is a process permitted by the corresponding policy 210*c* of the wireless LAN router 200.

If the process at the connection level is a higher-level process than the process permitted by the corresponding policy 31*b*, and the process at the network connection level of the wireless LAN router 200 is a higher-level process than the process permitted by the corresponding policy 210*c*, the connection setting unit 34*a* acquires the encrypted configuration information 210*a* from the wireless LAN router 200 and stores therein the encrypted configuration information 210*a*. The connection setting unit 34*a* also outputs the configuration information 31*a* and the configuration information 110*a* to the wireless LAN router 200.

Explained now is a process performed by the connection setting unit 34*a* when the IC card 30 connects to the mobile terminal 100 after connecting to the wireless LAN router 200, as explained earlier with reference to FIG. 10. The connection setting unit 34*a* acquires the result of determining if the network connection level of the mobile terminal 100 is a process permitted by the corresponding policy 110*c* of the mobile terminal 100.

If the process at the connection level is a higher-level process than the process permitted by the corresponding policy 31*b*, and the process at the network connection level of the mobile terminal 100 is a higher-level process than the process permitted by the corresponding policy 110*c*, the connection setting unit 34*a* outputs the configuration information 210*a* to the mobile terminal 100.

Figure 18:
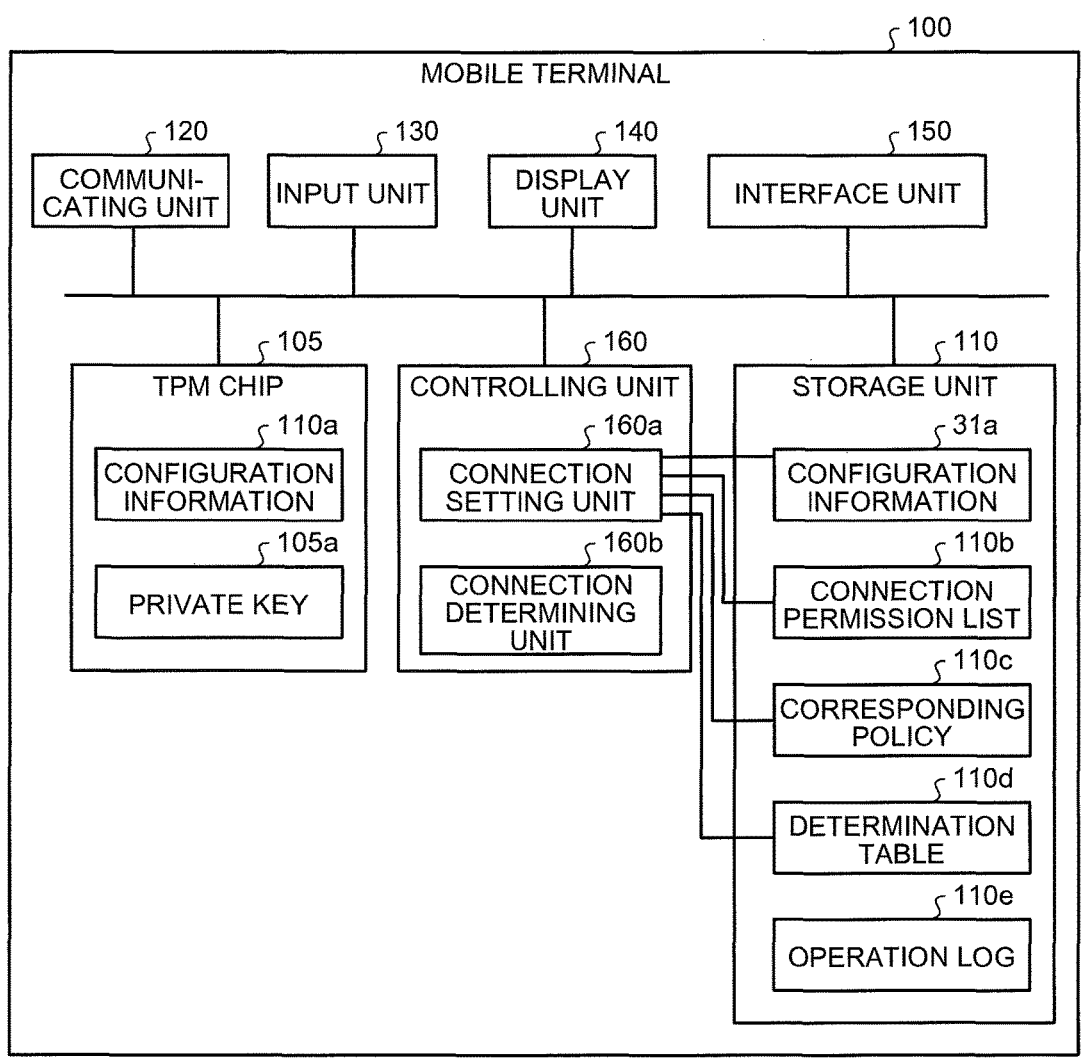
FIG. 18 is a functional block diagram illustrating a configuration of the mobile terminal according to the second embodiment.

A configuration of the mobile terminal 100 according to the second embodiment will now be explained. FIG. 18 is a functional block diagram illustrating a configuration of the mobile terminal 100 according to the second embodiment. As illustrated in FIG. 18, the mobile terminal 100 includes a TPM chip 105, a storage unit 110, a communicating unit 120, an input unit 130, a display unit 140, an interface unit 150, and a controlling unit 160. Because other units included in the mobile terminal 100 are the same as those included in a general mobile terminal, the explanations thereof are omitted herein.

The TPM chip 105 collects the configuration information of the mobile terminal 100 when the mobile terminal 100 is started, for example. The TPM chip 105 then hashes the configuration information thus collected and stores therein the configuration information as the configuration information 110*a*. The TPM chip 105 also stores therein a private key 105*a*. The private key 105*a* is the private key of the mobile terminal 100.

FIG. 19 is a schematic of an example of a data structure of the configuration information stored in the TPM chip on the mobile terminal. As illustrated in FIG. 19, the configuration information 110*a* includes Entry Number and Entry. For example, in the Entry with the Entry Number "1", the configuration information corresponding to the boot block portion of the mobile terminal 100 is stored in a hash format. In the Entry with the Entry Number "2", the configuration information corresponding to the BIOS portion of the mobile terminal 100 is stored in a hash format. In the Entry with the Entry Number "3", the configuration information corresponding to the device configuration portion of the mobile terminal 100 is stored in a hash format.

For example, the portion corresponding to the device configuration corresponds to one of a physical TCG chip, the version of a physical TCG, a physical OS, a virtual OS, a guest OS, a virtualized TCG chip, the version of a virtualized TCG, mandated software, prohibited software, and permitted software. The portion corresponding to the device configuration may also correspond to any one of the model number of the device, the serial number of the device, the model number of a physical OS, the serial number of a physical OS, the version of a physical OS, the model number of a virtual OS, the serial number of a virtual OS, a virtual OS, and the version of a virtual OS. The portion corresponding to the device configuration may also correspond to any one of the model number of a guest OS, the serial number of a guest OS, the version of a guest OS, the model number of software, the serial number of software, and a software version. The portion corresponding to the device configuration corresponds to a prohibited protocol, a permitted protocol, prohibited operation, and a permitted operation.

The communicating unit 120 is a processing unit that performs data communication with other devices over different types of networks. The communicating unit 120 exchanges data with the wireless LAN router 200*a*, the certificate authority 20, and the ISP 300 over the network 50. The controlling unit 160, which will be described later, exchanges data with the certificate authority 20, the wireless LAN router 200*a*, and the ISP 300 via the communicating unit 120.

The input unit 130 is an input device for entering various types of information to the mobile terminal 100. For example, the input unit 130 corresponds to a keyboard, a mouse, and a touch panel. The display unit 140 is a display device that displays various types of information output from the controlling unit 160. For example, the display unit 140 corresponds to a liquid crystal display or a touch panel. The interface unit 150 is an interface to be connected with various types of external devices. For example, the mobile terminal 100 may be connected to the IC card 30 via the interface unit 150. Alternatively, an IC card reader may be connected to the interface unit 150, and the mobile terminal 100 may be connected to the IC card 30 via the IC card reader.

The storage unit 110 is a storage unit storing therein the configuration information 31a, the connection permission list 110b, the corresponding policy 110c, a determination table 110d, and an operation log 110e. For example, the storage unit 110 corresponds to a storage device such as a RAM, a ROM, or a semiconductor memory device such as a flash memory.

The configuration information 31a is the configuration information 31a of the IC card 30 acquired at Step S124 in FIG. 7.

The connection permission list 110b corresponds to the connection permission list 110b generated at Step S152 in FIG. 10. The connection permission list 110b includes the configuration information 210a of the wireless LAN router 200.

FIG. 20 is a schematic of an example of a data structure of the connection permission list 110b in the mobile terminal. As illustrated in FIG. 20, the connection permission list 110b includes Year, Month, and Date of Creation, Time of Creation, and Designation Configuration Information. In FIG. 20, the Year, Month, and Date of Creation indicates the year, month, and date in and on which the connection permission list 110b is created. The Time of Creation indicates the time at which the connection permission list 110b is created. The Designation Configuration Information stores therein the configuration information 210a of the wireless LAN router 200a to which the mobile terminal 100 is permitted to connect. The configuration information 210a of the wireless LAN router 200a is hashed.

The corresponding policy 110c is policy information describing processes that the mobile terminal 100 is permitted to perform. FIG. 21 is a schematic of an example of a data structure of the corresponding policy for the mobile terminal. As illustrated in FIG. 21, the corresponding policy 110c includes Year, Month, and Date of Creation, Time of Creation, Policy, and Permissibility. The Year, Month, and Date of Creation indicates the year, month, and date in and on which the record is created. Time of Creation indicates the time at which the record is created. The Policy describes a process performed on the IC card 30 or on the wireless LAN router 200, for example. The Permissibility indicates if the process specified in the policy is permitted. For example, registered to the first line of the record in FIG. 21 is the information indicating that the process of "referring to a log on the wireless LAN router 200" is "permitted". Registered in the second line of the record in FIG. 21 is the information indicating that a process of "updating a log on the wireless LAN router 200" is "rejected". Registered in the third line of the record in FIG. 21 is the information indicating that a process of "moving data to IC card" is "permitted". Registered to the fourth line of the record in FIG. 21 is the information indicating that a process of "acquiring data from IC card" is "permitted".

The determination table 110d is a table for determining a network connection level. FIG. 22 is a schematic of an example of a data structure of a determination table for the mobile terminal. As illustrated in FIG. 22, the determination table 110d stores therein a degree of match and a network connection level in an associated manner. In FIG. 22, a degree of match is a value calculated by the ISP 300 based on the approval policy. For example, when the degree of match is "30", a network connection level having a degree of match equal to or less than "30" is permitted by the ISP 300. Examples of a network connection level having a degree of match equal to or less than "30" include "referring to a log on the wireless LAN router 200", "referring to a log on a PC", and "referring to a file on a PC". Examples of a network connection level having a degree of match equal to or less than "30" also includes "moving data to IC card" and "acquiring data from IC card". The corresponding policy 110c defines the extent by which the mobile terminal 100 permits the network connection levels permitted by the ISP 300.

The operation log 110e is information for retaining a log of the mobile terminal 100. FIG. 23 is a schematic of an example of a data structure of an operation log of the mobile terminal. As illustrated in FIG. 23, the operation log 110e retains Year, Month, and Date of Event, Time of Event, Operated Device, Operator, Description of Operation, and Name of Vendor in an associated manner. For example, the Year, Month, and Date of Event indicates the year, month, and date in and on which an operation is performed. The Time of Event indicates the time at which the operation is performed. The Operator indicates the person who made the operation. The Description of Operation describes the operation. The Name of Vendor indicates the vendor to which the operator belongs, for example.

The controlling unit 160 includes the connection setting unit 160a and a connection determining unit 160b. The controlling unit 160 corresponds to an integrated device such as an ASIC or an FPGA, for example. The controlling unit 160 may correspond to an electric circuit such as a CPU or an MPU, for example.

The connection setting unit 160a performs the process illustrated in FIG. 5 with the ISP 300 and performs the processes illustrated in FIGS. 7 and 10 with the IC card 30, when the mobile terminal 100 is connected to the IC card 30.

An example of the process performed by the connection setting unit 160a with the ISP 300 will now be explained. After connection to the IC card 30 is established, the connection setting unit 160a acquires the configuration information 110a from the TPM chip 105. The connection setting unit 160a generates a configuration information report 100A by encrypting the configuration information 110a using the public key of the ISP 300 and transmits the configuration information report 100A to the ISP 300.

FIG. 24 is a schematic of an example of a data structure of the configuration information report 100A. As illustrated in FIG. 24, the configuration information report 100A includes Year, Month, and Date of Creation, Time of Creation, Device Created, Signature Information, and Configuration Information 1 to Configuration Information N. Among these pieces of information, the Device Created includes the identification information or the like of the mobile terminal 100 having generated the configuration information report 100A. The Signature Information includes Signature Information A generated by the TPM chip 105. The information in the Configuration Information 1 to Configuration Information N corresponds to the configuration information 110a.

After transmitting the configuration information report 100A to the ISP 300, the connection setting unit 160a receives the encrypted response information 100B from the ISP 300. The connection setting unit 160a decrypts the response information 100B using the private key 105a of the TPM chip 105 and takes out the information of the degree of match from the response information 100B.

The connection setting unit 160a compares the degree of match with the determination table 110d, and determines a network connection level. The connection setting unit 160a determines if the process at the network connection level is a higher-level process than the process permitted by the corresponding policy 110c by comparing the network connection level thus determined with the corresponding policy 110c.

For example, the connection setting unit 160a may determine if the process at the network connection level is a higher-level process than that permitted by the corresponding policy 110c using the degree of match as a reference. For example, in FIG. 22, it is assumed herein that a process with a higher degree of match is a higher-level process. For example, when a network connection level is to "refer to a setting in the wireless LAN router (low security)", and a process permitted by the corresponding policy 110c is to "refer to a log on the wireless LAN router 200", the network connection level, which is to "refer to a setting in wireless LAN router (low security)" has a higher degree of match. In such a case, the connection setting unit 160a determines if the process at the network connection level is a higher-level process than the process permitted by the corresponding policy 110c.

The connection setting unit 160a also acquires the result of determining if the connection level of the IC card 30 is a process permitted by the corresponding policy 31b for the IC card 30.

If the process at the network connection level is a higher-level process than the process permitted by the corresponding policy 110c, and the process at the connection level of the IC card 30 is a higher-level process than the process permitted by the corresponding policy 31b, the connection setting unit 160a perform the processes in FIGS. 7 and 10 with the IC card 30.

In other words, the connection setting unit 160a encrypts the configuration information 110a using the public key of the mobile terminal 100, as explained earlier with reference to FIG. 7, and encrypts the configuration information 110a with the public key of the wireless LAN router 200, and outputs the configuration information 110a encrypted twice to the IC card 30. The connection setting unit 160a acquires the configuration information 31a from the IC card 30 and stores the configuration information 31a in the storage unit 110.

The connection setting unit 160a also acquires the encrypted configuration information 210a from the IC card 30, as explained earlier with reference to FIG. 10. The connection setting unit 160a generates the connection permission list 110b by decrypting the configuration information 210a using the private key 105a of the mobile terminal 100, and registers the connection permission list 110b in the storage unit 110. Because the encrypted information is encrypted twice, even after the information is decrypted with the private key 105a, the information remains encrypted with the public key of the wireless LAN router 200.

The connection determining unit 160b is a processing unit that connects to the wireless LAN router 200a over the network 50 illustrated in FIG. 2, performs the processes illustrated in FIGS. 11 and 12, and determines if connection is to be established to the wireless LAN router 200.

A process corresponding to FIG. 11 performed by the connection determining unit 160b will now be explained. The connection determining unit 160b acquires the configuration information 110a from the TPM chip 105 and encrypts the configuration information 110a using the public key of the wireless LAN router 200. The connection determining unit 160b then transmits the configuration information 31a, the configuration information 110a, and the connection permission list 110b to the wireless LAN router 200.

After transmitting the configuration information 31a, the configuration information 110a, and the connection permission list 110b to the wireless LAN router 200, the connection determining unit 160b receives the connection permission list 210b and the configuration information 110a from the wireless LAN router 200. If the connection determining unit 160b cannot receive the connection permission list 210b and the configuration information 110a from the wireless LAN router 200, a connection error may be displayed on the display unit 140.

The connection determining unit 160b decrypts the connection permission list 210b using the private key 105a of the mobile terminal 100. When the configuration information 110a included in the connection permission list 210b and the configuration information 110a received from the wireless LAN router 200 match, the connection determining unit 160b accepts the connection. When a connection determining unit 260b, which is described later, in the wireless LAN router 200 accepts the connection as well, connection is established between the mobile terminal 100 and the wireless LAN router 200.

A process corresponding to FIG. 12 performed by the connection determining unit 160b will now be explained. When the configuration information 31a, the configuration information 210a, and the connection permission list 210b are received from the wireless LAN router 200, the connection determining unit 160b decrypts the connection permission list 210b using the private key 105a of the mobile terminal 100.

If these pieces of the configuration information 31a match and the configuration information 110a included in the connection permission list 210b and the configuration information 110a on the TPM chip 105 match, the connection determining unit 160b transmits the connection permission list 110b and the configuration information 210a that is received from the wireless LAN router 200 to the wireless LAN router 200. These pieces of the configuration information 31a matching means the configuration information 31a received from the wireless LAN router 200 matching the configuration information 31a stored in the mobile terminal 100.

If these pieces of the configuration information 31a do not match, or if the configuration information 110a included in the connection permission list 210b and the configuration information 110a on the TPM chip 105 do not match, the connection determining unit 160b may display a connection error on the display unit 140.

Figure 25:
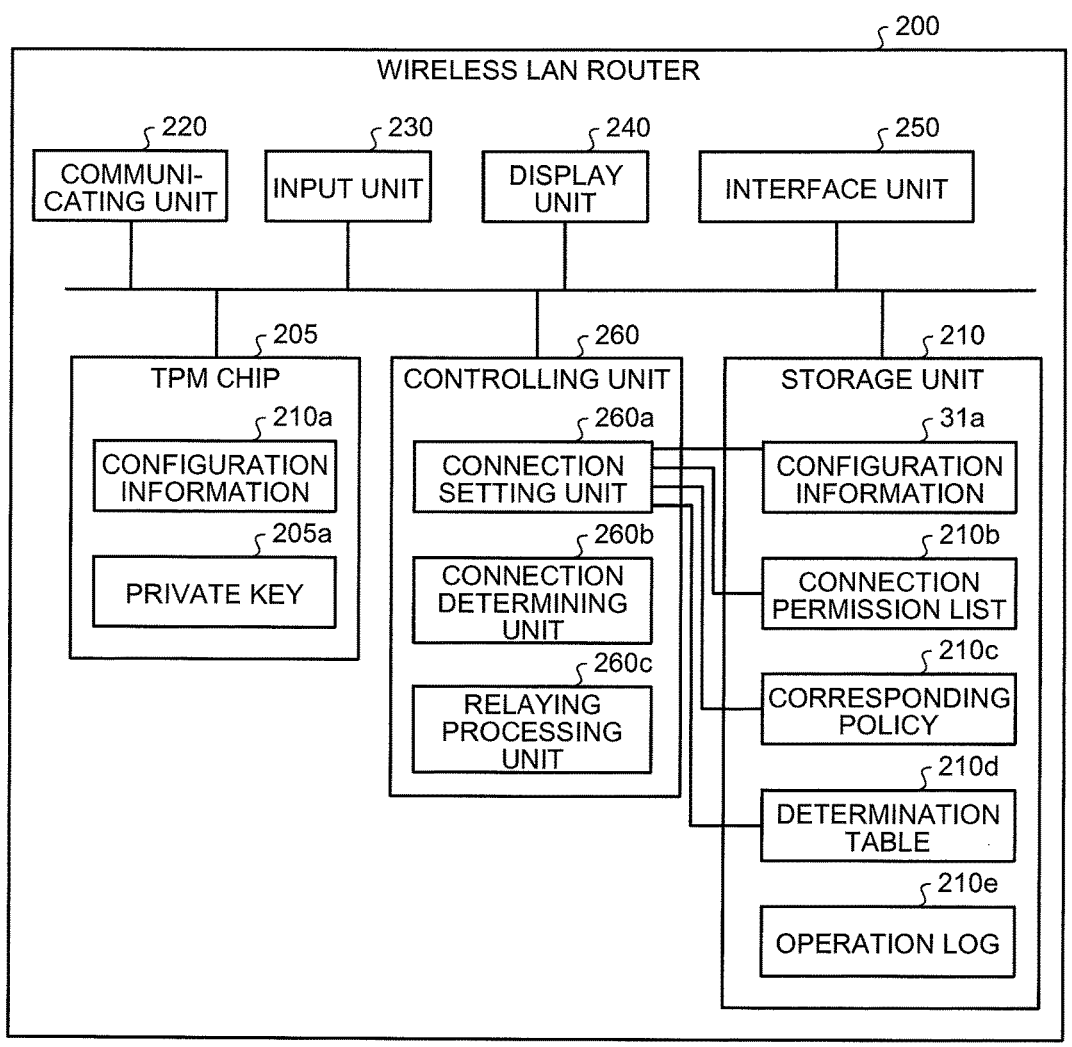
FIG. 25 is a functional block diagram illustrating a configuration of the wireless LAN router according to the second embodiment.

A configuration of the wireless LAN router 200 according to the second embodiment will now be explained. FIG. 25 is a functional block diagram illustrating a configuration of the wireless LAN router according to the second embodiment. As illustrated in FIG. 25, the wireless LAN router 200 includes a TPM chip 205, a storage unit 210, a communicating unit 220, an input unit 230, a display unit 240, an interface unit 250, and a controlling unit 260. Because other units included in the wireless LAN router 200 are the same as those included in a general wireless LAN router, the explanations thereof are omitted herein.

The TPM chip 205 collects the configuration information of the wireless LAN router 200 when the wireless LAN router 200 is started, for example. The TPM chip 205 hashes the configuration information thus collected and stores therein the configuration information as the configuration information 210a. The TPM chip 205 also stores therein a private key 205a. The private key 205a is the private key of the wireless LAN router 200.

FIG. 26 is a schematic of an example of a data structure of the configuration information stored in TPM chip on the wireless LAN router. As illustrated in FIG. 26, the configuration information 210a includes Entry Number and Entry. For example, in the Entry with the Entry Number "1", the configuration information corresponding to the boot block portion of the wireless LAN router 200 is stored in a hash format. In the Entry with the Entry Number "2", the configuration information corresponding to the BIOS portion of the wireless LAN router 200 is stored in a hash format. In the Entry with the Entry Number "3", the configuration information corresponding to the device configuration portion of the wireless LAN router 200 is stored in a hash format. The portion corresponding to the device configuration is the same as the portion corresponding to the device configuration explained with reference to FIG. 19.

The communicating unit 220 is a processing unit that performs data communication with other devices over different types of networks. The communicating unit 120 exchanges data with the mobile terminal 100, the certificate authority 20, and the ISP 300 over the network 50. The controlling unit 260, which is described later, exchanges data with the certificate authority 20, the wireless LAN router 200a, and the ISP 300 via the communicating unit 120.

The input unit 230 is an input device for entering various types of information to the wireless LAN router 200. For example, the input unit 130 corresponds to a keyboard, a mouse, and a touch panel. The display unit 140 is a display device that displays various types of information output from the controlling unit 260. For example, the display unit 240 corresponds to a liquid crystal display or a touch panel. The interface unit 250 is an interface to be connected with various types of external devices. For example, the wireless LAN router 200 may connect to the IC card 30 via the interface unit 250. Alternatively, an IC card reader may be connected to the interface unit 250, and the wireless LAN router 200 may connect to the IC card 30 via the IC card reader.

The storage unit 210 is a storage unit storing therein the configuration information 31a, the connection permission list 210b, the corresponding policy 210c, a determination table 210d, and an operation log 210e. For example, the storage unit 210 corresponds to a storage device such as a RAM, a ROM, or a semiconductor memory device such as a flash memory.

The configuration information 31a is the configuration information 31a of the IC card 30 acquired at Step S141 in FIG. 9.

The connection permission list 210b corresponds to the connection permission list 210b generated at Step S142 in FIG. 9. The connection permission list 210b includes the configuration information 110a of the mobile terminal 100.

FIG. 27 is a schematic of an example of a data structure of the connection permission list 210b for the wireless LAN router. As illustrated in FIG. 27, the connection permission list 210b includes Year, Month, and Date of Creation, Time of Creation, and Designation Configuration Information. In FIG. 27, the Year, Month, and Date of Creation indicates the year, month, and date in and on which the connection permission list 210b is generated. The Time of Creation indicates the time at which the connection permission list 210b is generated. The Designation Configuration Information stores therein the configuration information 110a of the mobile terminal 100a to which the wireless LAN router is permitted to connect. The configuration information 110a of the mobile terminal 100a is hashed.

The corresponding policy 210c is a policy that describes a process permitted to the wireless LAN router 200. FIG. 28 is a schematic of an example of a data structure of the corresponding policy for the wireless LAN router. As illustrated in FIG. 28, the corresponding policy 210c includes Year, Month, and Date of Creation, Time of Creation, policy, and Permissibility. The Year, Month, and Date of Creation indicates the year, month, and date in and on which the record is created. The Time of Creation indicates the time at which the record is created. The Policy describes a process performed on the IC card 30 or on the wireless LAN router 200, for example. The Permissibility indicates if the process specified in the policy is permitted. For example, registered to the first line of the record in FIG. 28 is the information indicating that the process of "referring to a log on the wireless LAN router 200" is "permitted". Registered in the second line of the record in FIG. 28 is the information indicating that a process of "updating a log on the wireless LAN router 200" is "rejected". Registered in the third line of the record in FIG. 28 is the information indicating that a process of "moving data to IC card" is "permitted". Registered in the fourth line of the record in FIG. 28 is the information indicating that a process of "acquiring data from IC card" is "permitted".

The determination table 210d is a table for determining a network connection level. Because the data structure of the determination table 210d is the same as that of the determination table 110d illustrated in FIG. 22, the explanation thereof is omitted herein.

The operation log 210e is information for retaining a log of the wireless LAN router 200. FIG. 29 is a schematic of an example of a data structure of an operation log of the wireless LAN router. As illustrated in FIG. 29, the operation log 210e retains Year, Month, and Date of Event, Time of Event, Operated Device, Operator, Description of Operation, and Name of Vendor in an associated manner. For example, the Year, Month, and Date of Event indicates the year, month, and date in and on which an operation is performed. The Time of Event indicates the time at which the operation is performed. The Operator indicates the person who made the operation. The Description of Operation describes the operation. The Name of Vendor indicates the vendor to which the operator belongs, for example.

The controlling unit 260 includes a connection setting unit 260a, a connection determining unit 260b, and a relaying processing unit 260c. The controlling unit 260 corresponds to an integrated device such as an ASIC or an FPGA, for example. The controlling unit 260 may correspond to an electric circuit such as a CPU or an MPU, for example.

The connection setting unit 260a performs the process illustrated in FIG. 8 with the ISP 300 and performs the process illustrated in FIG. 9 with the IC card 30, when the wireless LAN router 200 is connected to the IC card 30.

An example of the process performed by the connection setting unit 260a with the ISP 300 will now be explained. After the wireless LAN router 200 is connected to the IC card 30, the connection setting unit 260a acquires the configuration information 210a from the TPM chip 205. The connection setting unit 260a then generates a configuration information report 200A by encrypting the configuration information 210a using the public key of the ISP 300 and transmits the configuration information report 200A to the ISP 300.

FIG. 30 is a schematic of an example of a data structure of the configuration information report 200A. As illustrated in FIG. 30, the configuration information report 200A includes Year, Month, and Date of Creation, Time of Creation, Device Created, Signature Information, and Configuration Information 1 to Configuration Information N. Among these pieces of information, the Device Created includes identification information or the like of the wireless LAN router 200 having generated the configuration information report 200A. The Signature Information includes Signature Information B generated by the TPM chip 205. The information of the Configuration Information 1 to the Configuration Information N corresponds to the configuration information 210a.

After transmitting the configuration information report 200A to the ISP 300, the connection setting unit 260a receives encrypted response information 200B from the ISP 300. The connection setting unit 260a decrypts the response information 200B using the private key 205a on the TPM chip 205 and takes out the information of a degree of match from the response information 200B.

The connection setting unit 260a compares the degree of match with the determination table 210d, and determines a network connection level. The connection setting unit 260a determines if the process at the network connection level is a higher-level process than the process permitted by the corresponding policy 210c by comparing the network connection level thus determined with that in the corresponding policy 210c. Because the way in which such a determination is made is the same as that performed by the connection setting unit 260a in the mobile terminal 100, the detailed explanation thereof is omitted herein.

The connection setting unit 260a acquires the result of determining if the connection level of the IC card 30 is a process permitted by the corresponding policy 31b for the IC card 30.

If the process at the network connection level is a higher-level process than the process permitted by the corresponding policy 210c and if the process at the connection level of the IC card 30 is a higher-level process than the process permitted by the corresponding policy 31b, the connection setting unit 260a performs the process illustrated in FIG. 9 with the IC card 30.

In other words, as illustrated in FIG. 9, the connection setting unit 260a acquires the configuration information 31a from the IC card 30, and registers the configuration information 31a in the storage unit 210.

The connection setting unit 260a also acquires the encrypted configuration information 110a from the IC card 30. The connection setting unit 160a generates the connection permission list 210b by decrypting the configuration information 110a using the private key 205a of the wireless LAN router 200, and registers the connection permission list 210b in the storage unit 210. Because the encrypted information is encrypted twice, even after the information is decrypted with the private key 205a, the information remains encrypted with the public key of the mobile terminal 100.

The connection determining unit 260b is a processing unit that connects to the mobile terminal 100 over the network 50 illustrated in FIG. 2 and performs the processes illustrated in FIGS. 11 and 12, to determine if the wireless LAN router 200 is to connect to the mobile terminal 100.

The process corresponding to FIG. 11 performed by the connection determining unit 260b will now be explained. When the configuration information 31a, the configuration information 110a, and the connection permission list 110b are received from the mobile terminal 100, the connection determining unit 160b decrypts the connection permission list 110b using the private key 205a of the wireless LAN router 200.

If these pieces of the configuration information 31a match and the configuration information 210a included in the connection permission list 110b and the configuration information 210a on the TPM chip 205 match, the connection determining unit 260b transmits the connection permission list 210b and the configuration information 110a that is received from the mobile terminal 100 to the mobile terminal 100. These pieces of the configuration information 31a matching herein means the configuration information 31a received from the mobile terminal 100 and the configuration information 31a stored in the wireless LAN router 200 matching.

If these pieces of the configuration information 31a do not match, or if the configuration information 210a included in the connection permission list 110b and the configuration information 210a on the TPM chip 205 do not match, the connection determining unit 260b may display a connection error on the display unit 240.

The process corresponding to FIG. 12 performed by the connection determining unit 260b will now be explained. The connection determining unit 260b acquires the configuration information 210a from the TPM chip 205 and encrypts the configuration information 210a using the public key of the mobile terminal 100. The connection determining unit 260b then transmits the configuration information 31a, the configuration information 210a, and the connection permission list 210b to the mobile terminal 100.

After transmitting the configuration information 31a, the configuration information 210a, and the connection permission list 210b to the mobile terminal 100, the connection determining unit 260b receives a connection permission list 110b and the configuration information 210a from the mobile terminal 100. When the connection permission list 110b and the configuration information 210a cannot be received from the mobile terminal 100, the connection determining unit 260b may display a connection error on the display unit 240.

The connection determining unit 260b then decrypts the connection permission list 110b using the private key 205a of the wireless LAN router 200. When the configuration information 210a included in the connection permission list 110b and the configuration information 210a received from the mobile terminal 100 match, the connection determining unit 260b accepts the connection.

Figure 31:
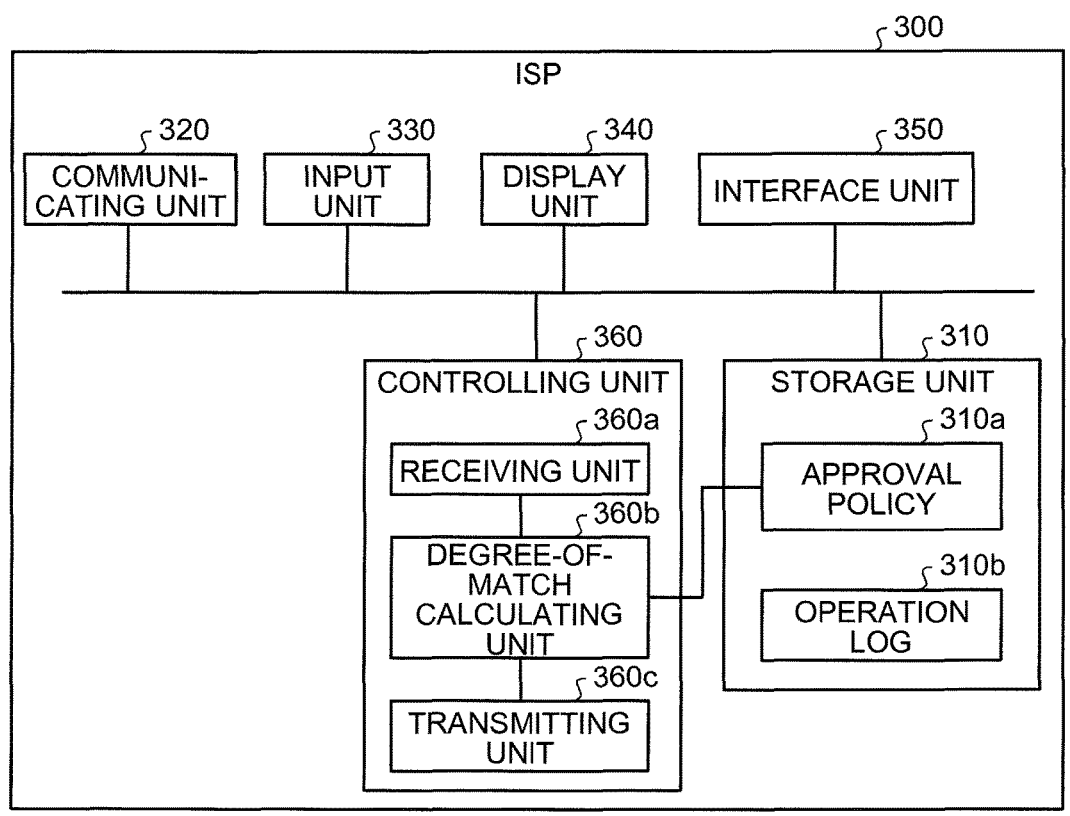
FIG. 31 is a functional block diagram illustrating a configuration of the ISP according to the second embodiment.

A configuration of the ISP 300 according to the second embodiment will now be explained. FIG. 31 is a functional block diagram illustrating a configuration of the ISP according to the second embodiment. As illustrated in FIG. 31, the ISP 300 includes a storage unit 310, a communicating unit 320, an input unit 330, a display unit 340, an interface unit 350, and a controlling unit 360.

The communicating unit 320 is a processing unit that performs data communication with the certificate authority 20, the mobile terminal 100, and the wireless LAN router 200, for example. The controlling unit 360, which is described later, exchanges data with the certificate authority 20, the mobile terminal 100, and the wireless LAN router 200 via the communicating unit 320.

The input unit 330 is an input device for entering various types of information to the ISP 300. For example, the input unit 330 corresponds to a keyboard, a mouse, and a touch panel. The display unit 340 is a display device that displays various types of information output from the controlling unit 360. For example, the display unit 340 corresponds to a liquid crystal display or a touch panel. The interface unit 350 is an interface to be connected with various types of external devices.

The storage unit 310 is a storage device storing therein a approval policy 310a and an operation log 310b. For example, the storage unit 310 corresponds to a storage device such as a RAM, a ROM, or a semiconductor memory device such as a flash memory.

The approval policy 310a is the data used when a degree of match for identifying a network connection level or a connection level is calculated. FIG. 32 is a schematic of an example of a data structure of the approval policy. As illustrated in FIG. 32, the approval policy 310a retains Configuration Items and Value in an associated manner. A Configuration Item describes a piece of configuration information. Each piece of information in the Configuration Items is a hash. The Values represent values that are added as a degree of match. A configuration information item may be added as appropriate. Each of the Values may be updated as appropriate.

The operation log 310b is information for retaining a log of the ISP 300. FIG. 33 is a schematic of an example of a data structure of an operation log of the ISP. As illustrated in FIG. 33, the operation log 310b retains Year, Month, and Date of Event, Time of Event, Operated Device, Operator, Description of Operation, and Name of Vendor in an associated manner. For example, Year, Month, and Date of Event indicates the year, month, and date in and on which an operation is performed. The Time of Event indicates the time at which the operation is performed. The Operator indicates the person who made the operation. The Description of Operation describes the operation. The Name of Vendor indicates the vendor to which the operator belongs, for example.

The controlling unit 360 includes a receiving unit 360a, a degree-of-match calculating unit 360b, and a transmitting unit 360c. The controlling unit 360 corresponds to an integrated device such as an ASIC or an FPGA, for example. The controlling unit 360 may correspond to an electric circuit such as a CPU or an MPU, for example.

The receiving unit 360a is a processing unit that receives the configuration information report 30A from the IC card 30, receives the configuration information report 100A from the mobile terminal 100, and receives the configuration information report 200A from the wireless LAN router 200. The receiving unit 360a outputs the configuration information reports 30A, 100A, and 200A to the degree-of-match calculating unit 360b.

The degree-of-match calculating unit 360b is a processing unit that calculates a degree of match for the IC card 30, a degree of match for the mobile terminal 100, and a degree of match for the wireless LAN router 200, based on the configuration information reports 30A, 100A, and 200A respectively, and on the approval policy 310a.

An example of a process in which the degree-of-match calculating unit 360b calculates a degree of match for the mobile terminal 100 will now be explained. The degree-of-match calculating unit 360b decrypts the configuration information report 100A using a private key of the ISP 300, to acquire the configuration information 110a of the mobile terminal 100.

The degree-of-match calculating unit 360b compares the configuration information 110a with the Configuration Items in the approval policy 310a, and identifies matching Configuration Items in the approval policy 310a. The degree-of-match calculating unit 360b then calculates a degree of match for the mobile terminal 100 by acquiring the sum of the Values represented in the matching Configuration Items.

For example, it is assumed that, when the degree-of-match calculating unit 360b compares the configuration information 110a with the Configuration Items in the approval policy 310a, and finds matches with the Configuration Items "boot block a", "BIOS-a", "boot block b", and "boot manager a". The value of the "boot block a" is "10". The value of the "BIOS-a" is "10". The value of the "boot block b" is "3". The value of the "boot manager a" is "10". In such a case, the degree-of-match calculating unit 360b acquires "33" as a degree of match for the mobile terminal 100.

The degree-of-match calculating unit 360b generates the response information 100B by encrypting the information of the degree of match with the configuration information 110a using the public key of the mobile terminal. The degree-of-match calculating unit 360b then outputs the response information 100B to the transmitting unit 360c.

An example of a process in which the degree-of-match calculating unit 360b calculates a degree of match for the wireless LAN router 200 will now be explained. The degree-of-match calculating unit 360b decrypts the configuration information report 200A using a private key of the ISP 300, to acquire the configuration information 210a of the wireless LAN router 200.

The degree-of-match calculating unit 360b compares the configuration information 210a with the Configuration Items in the approval policy 310a, and identifies matching Configuration Items in the approval policy 310a. The degree-of-match calculating unit 360b calculates the degree of match for the wireless LAN router 200 by acquiring the sum of the values of the matching Configuration Items. The process of calculating a degree of match is the same as the process of calculating a degree of match for the mobile terminal 100.

The degree-of-match calculating unit 360b generates the response information 200B by encrypting the configuration information 210a and the information of the degree of match using the public key of the wireless LAN router 200. The degree-of-match calculating unit 360b then outputs the response information 200B to the transmitting unit 360c.

An example of a process in which the degree-of-match calculating unit 360b calculates a degree of match for the IC card 30 will now be explained. The degree-of-match calculating unit 360b decrypts the configuration information report 30A using a private key of the ISP 300, to acquire the configuration information 31a of the IC card 30.

The degree-of-match calculating unit 360b compares the configuration information 31a with the Configuration Items in the approval policy 310a, and identifies matching Configuration Items in the approval policy 310a. The degree-of-match calculating unit 360b calculates a degree of match for the IC card 30 by acquiring the sum of the values of the matching Configuration Items. The process of calculating a degree of match is the same as the process of calculating a degree of match for the mobile terminal 100.

The transmitting unit 360c is a processing unit that transmits the response information 30B, 100B, and 200B to the IC card 30, the mobile terminal 100, and the wireless LAN router 200, respectively. When the configuration information report 100A is received from the mobile terminal 100a, the ISP 300 transmits the response information 100B to the mobile terminal 100a. When the configuration information report 200A is received from the wireless LAN router 200a, the ISP 300 transmits the response information 200B to the wireless LAN router 200a.

The effects achieved by the system according to the second embodiment will now be explained. Once the ISP 300 approves a piece of configuration information collected by the TPM chip on the mobile terminal 100 and another piece of configuration information collected by the TPM chip on the wireless LAN router 200, these pieces of configuration information are exchanged between the mobile terminal 100 and the wireless LAN router 200 using the IC card 30. By performing this process in advance, each of the mobile terminal 100 and the wireless LAN router 200 comes to own a pair of configuration information that are owned only by the appropriate designations. For example, when the wireless LAN router 200 receives a connection request from the mobile terminal 100 over the network 50, the wireless LAN router 200 controls to accept or to reject the connection from the mobile terminal 100 using the pair of pieces of configuration information received from the mobile terminal 100. In the manner described above, the system according to the second embodiment allows connection to be established between appropriate designations, when devices are to be connected over a network 50.

Furthermore, in the system according to the second embodiment, when the configuration information 31*a* collected by the TPM chip mounted on the IC card 30 is approved by the ISP 300, the configuration information 110*a* of the mobile terminal 100 and the configuration information 210*a* of the wireless LAN router 200 are stored in the IC card 30. Therefore, the configuration information 110*a* of the mobile terminal 100 and the configuration information 210*a* of the wireless LAN router 200 can be exchanged safely using the IC card 30 having approved by the ISP 300.

Furthermore, in the system according to the second embodiment, the configuration information 31*a* collected by the TPM chip 32 on the IC card 30 is retained on the mobile terminal 100 and on the wireless LAN router 200. The configuration information 31*a* of the IC card 30 is then used again to determine whether connection is to be established between the mobile terminal 100 and the wireless LAN router 200 over the Internet 50. Therefore, connection can be established more safely.

Although some embodiments of the present invention are explained above, the present invention may be implemented in various different configurations other than those disclosed in the embodiments. Another embodiment of the present invention will now be explained.

Figure 34:
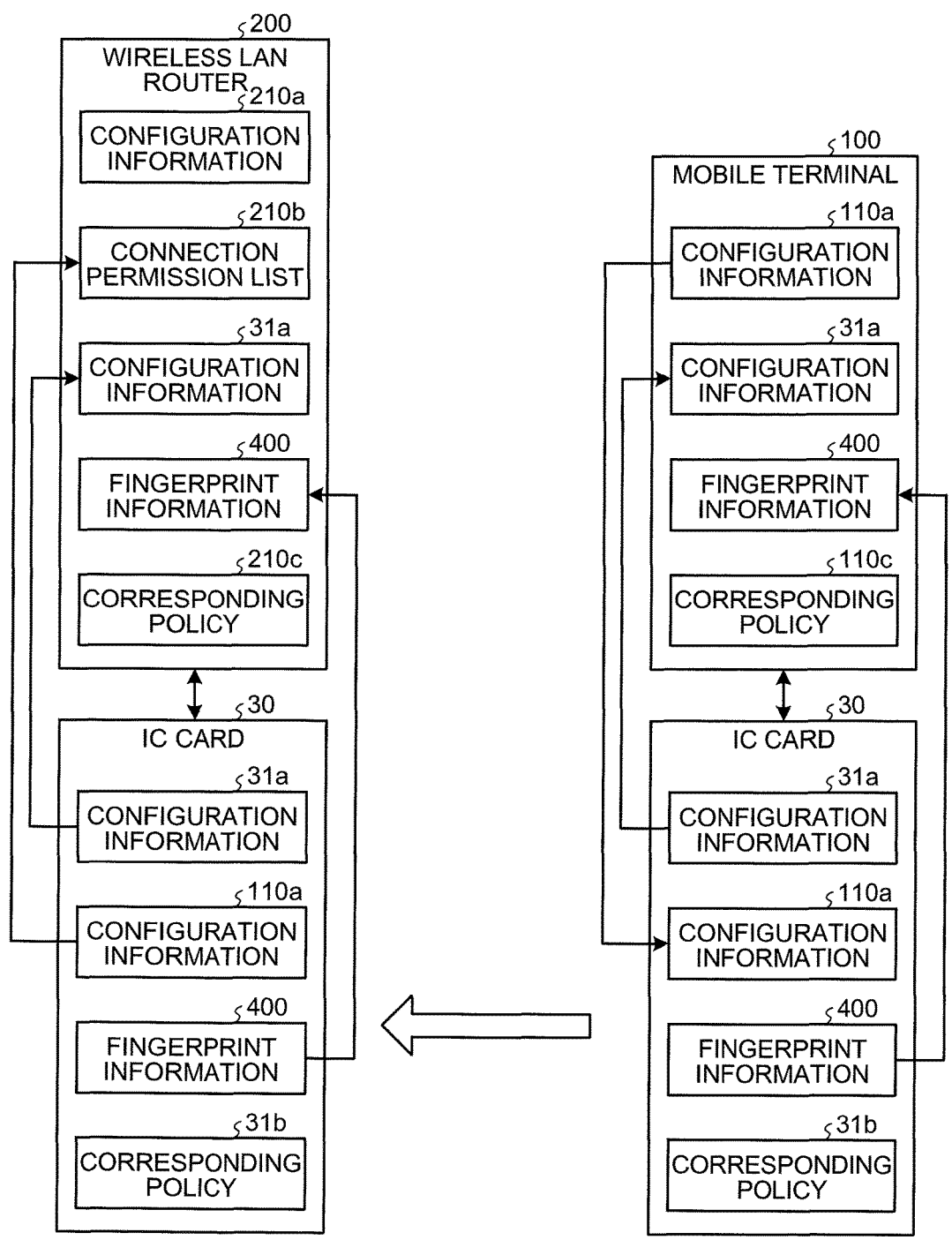
FIG. 34 is a first schematic for explaining another embodiment of the present invention.
Figure 35:
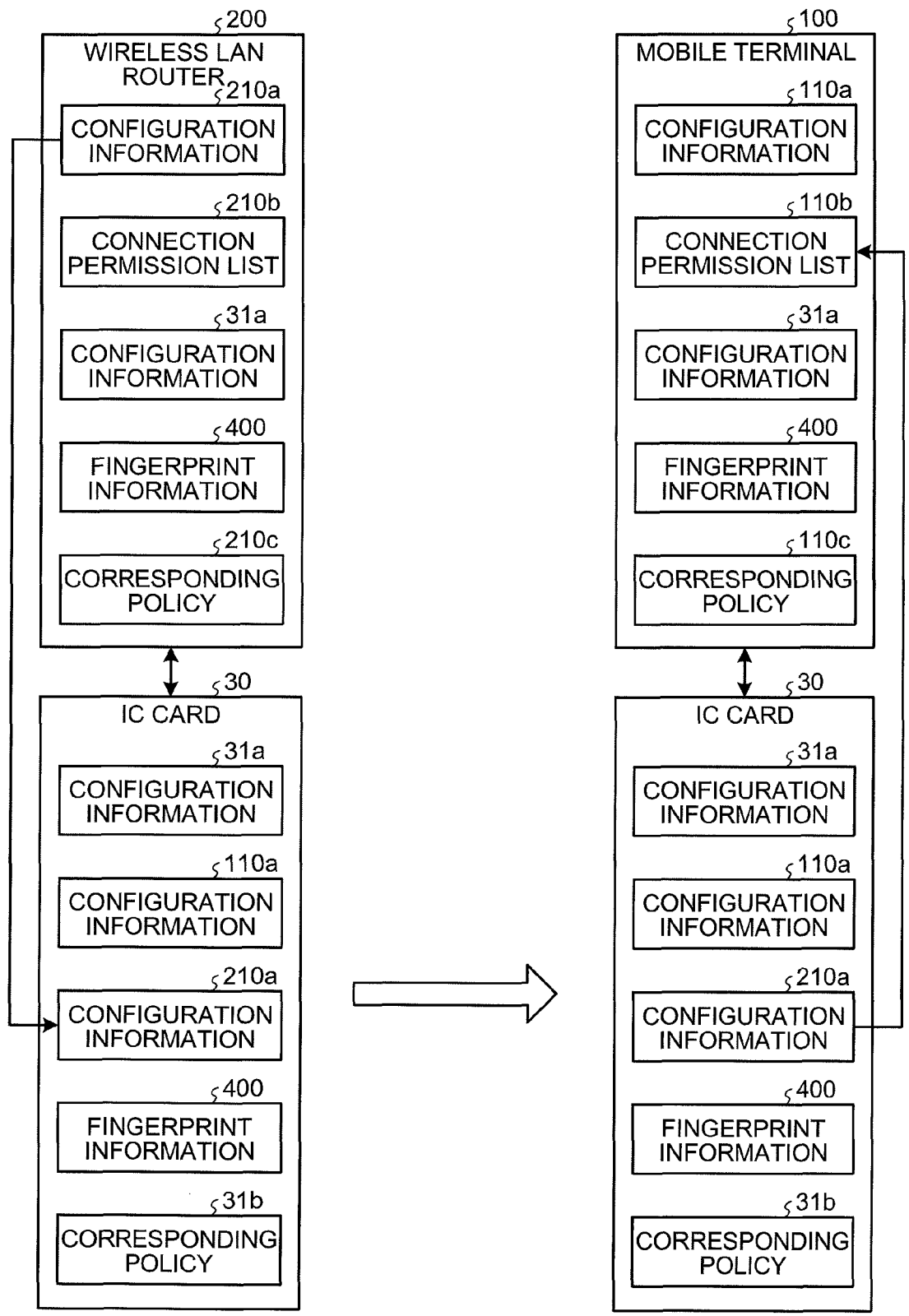
FIG. 35 is a second schematic for explaining the other embodiment of the present invention.

For example, fingerprint information of a maintenance person or the like may be stored in the IC card 30, and such fingerprint information may be used to determine if connection is to be established between the mobile terminal 100 and the wireless LAN router 200. FIGS. 34 and 35 are schematics for explaining the other embodiment.

Before any data is exchanged, the IC card 30 has the configuration information 31*a* of the IC card 30, fingerprint information 400, and the corresponding policy 31*b*, the mobile terminal 100 has the configuration information 110*a* of the mobile terminal 100 and the corresponding policy 110*c*, and the wireless LAN router 200 has the configuration information 210*a* of the wireless LAN router 200 and the corresponding policy 210*c*. The fingerprint information 400 is fingerprint information of a maintenance person, for example.

In FIG. 34, once the mobile terminal 100 and the IC card 30 are approved by the ISP 300, the mobile terminal 100 and the IC card 30 are connected, and the configuration information 31*a* of the IC card 30 and the fingerprint information 400 are registered to the mobile terminal 100, and the configuration information 110*a* of the mobile terminal 100 is registered to the IC card 30.

The maintenance person then carries the IC card 30 to a place where the wireless LAN router 200 is installed. When the wireless LAN router 200 and the IC card 30 are approved by the ISP 300, the wireless LAN router 200 and the IC card 30 are connected. The configuration information 31*a* of the IC card 30 and the fingerprint information 400 are then registered to the wireless LAN router. The configuration information 110*a* of the mobile terminal 100 is registered to the wireless LAN router 200 as the connection permission list 210*b*.

In FIG. 35, the configuration information 210*a* of the wireless LAN router 200 is registered to the IC card 30. The maintenance person then carries back the IC card 30 to the place where the mobile terminal 100 is deployed. Once the mobile terminal 100 and the IC card 30 are approved again by the ISP 300, the configuration information 210*a* of the wireless LAN router 200 is registered to the mobile terminal 100 as the connection permission list 110*b*.

As illustrated in FIGS. 34 and 35, by allowing the maintenance person to transport the information using the IC card 30, the configuration information 110*a*, the connection permission list 110*b*, the configuration information 31*a*, the fingerprint information 400, and the corresponding policy 110*c* are registered to the mobile terminal 100, and the configuration information 210*a*, the connection permission list 210*b*, the configuration information 31*a*, the fingerprint information 400, and the corresponding policy 210*c* are registered to the wireless LAN router 200.

When the mobile terminal 100 and the wireless LAN router 200 are to be connected over the network 50, the fingerprint information 400 may be used further. For example, at Step S161 in FIG. 11, the mobile terminal 100 may additionally transmit the fingerprint information 400, and, at Step S164, the wireless LAN router 200 may further determine if the fingerprint information received from the mobile terminal 100 and the fingerprint information 400 on the wireless LAN router 200 match.

The fingerprint information 400 stored in the IC card 30 may be encrypted using a public key of the maintenance person. When the fingerprint information 400 on the IC card 30 is moved to the wireless LAN router 200, the fingerprint information 400 is decrypted using a private key of the maintenance person. The fingerprint information 400 then may be retained on the wireless LAN router 200 in a manner encrypted with the public key of the wireless LAN router 200, for example, and may be decrypted using the private key of the wireless LAN router 200 before verifying the fingerprint information 400.

Furthermore, the fingerprint information 400 encrypted with the public key of the maintenance person is retained on the mobile terminal 100. Before the mobile terminal 100 connects to the wireless LAN router 200, the mobile terminal 100 may decrypt the fingerprint information 400 using the private key of the maintenance person and encrypt the fingerprint information 400 again with the public key of the wireless LAN router 200, before transmitting the fingerprint information 400 to the wireless LAN router 200.

In the manner described above, because the fingerprint information of a maintenance person is further used to determine if connection is to be established between the mobile terminal 100 and the wireless LAN router 200, connection can be established more safely. In the explanations in FIGS. 34 and 35, fingerprint information is used as an example, but any other biological information may be used. For example, biological information such as voice information, vein information, and iris may be used instead of fingerprint information.

Furthermore, the IC card 30 may output identification information unique to the maintenance person and associated with the fingerprint information to the mobile terminal 100 and the wireless LAN router 200, instead of outputting fingerprint information to the mobile terminal 100 and the wireless LAN router 200. The unique identification information and each piece of the configuration information may then be used to determine if connection is to be established between the mobile terminal 100 and the wireless LAN router 200.

Furthermore, the mobile terminal 100, the wireless LAN router 200, and the IC card 30 may be provided with a mechanism for allowing the IC card 30 to determine if the fingerprint information in the IC card 30 and the fingerprint information of the maintenance person match, and activating the public keys used in the data communication between the mobile terminal 100 and the wireless LAN router 200 when these pieces of fingerprint information match.

Explained in the second embodiment is an example in which configuration information is exchanged between the mobile terminal 100a and the wireless LAN router 200a using the IC card 30 before establishing connection between the mobile terminal 100a and the wireless LAN router 200a, but the present invention is not limited thereto. For example, configuration information may be exchanged between a mobile terminal 100b and the wireless LAN router 200a using the same IC card 30 or another IC card, and the wireless LAN router 200a may then be allowed to establish a secure connection with the mobile terminal 100a and with a mobile terminal 100b.

In explaining the embodiments, the mobile terminal 100 and the wireless LAN router 200 are used as an example of an electronic device establishing connection over the network 50, but an electronic device to which the present invention can be applied is not limited thereto. For example, an electronic device to which the present invention can be applied may be any electronic device connecting to a network. For example, the electronic device may be a server, a printer, a network device, an external storage, a mobile phone, a smartphone, a refrigerator, a washing machine, a television, a stereo system, medical equipment, and machining equipment.

The connection setting unit 160a in the mobile terminal 100 illustrated in FIG. 18 is an example of an acquiring unit and a storing unit. The connection determining unit 160b is an example of a controlling unit. The connection setting unit 260a illustrated in FIG. 25 is an example of the acquiring unit and the storing unit. The connection determining unit 260b is an example of the controlling unit.

The data structures of the connection permission lists 110b and 210b illustrated in FIGS. 12 and 19 are merely an example. For example, the connection permission list 110b, 210b may include Permitted Device, Permitted User, Permitted ISP, Source, Designation, and Permissibility. The Permitted Device represents information of an electronic device permitted to connect with. The Permitted User represents information of a user permitted to connect with. The Permitted ISP represents information of the ISP 300 permitted to connect with. The Source and the Designation represents information of a source electronic device and a designation electronic device to which connection is permitted. The Permissibility represents information if connection is permitted.

According to an embodiment of the present invention, connection can be established to an appropriate designation when connection is to be established between devices over a long-distance network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:
1. A network connecting method comprising:
   first collecting, at a tamper-resistant chip mounted on a first electronic device, first configuration information of the first electronic device, wherein the first configuration information includes software codes of software installed in the first electronic device and hardware information of first hardware installed in the first electronic device;
   first storing, by the first electronic device, the first configuration information in a portable medium, when the first configuration information is approved by a third party device;
   second collecting, at a tamper-resistant chip mounted on a second electronic device, second configuration information of the second electronic device, wherein the second configuration information includes software codes of software installed in the second electronic device and hardware information of second hardware installed in the second electronic device;
   second storing, by the second electronic device, the second configuration information in the portable medium, when the second configuration information is approved by the third party device;
   acquiring, by the second electronic device, the first configuration information from the portable medium;
   acquiring, by the first electronic device, the second configuration information from the portable medium;
   transmitting, by the first electronic device, the first configuration information of the first electronic device and the second configuration information of the second electronic device that is acquired from the portable medium to the second electronic device over a long-distance network; and
   controlling, by the second electronic device, connection between the first electronic device and the second electronic device over the long-distance network based on the first configuration information and the second configuration information received from the first electronic device.

2. The network connecting method according to claim 1, wherein
   at the first storing, the first electronic device stores the first configuration information in the portable medium after third configuration information of the portable medium collected by a tamper-resistant chip mounted on the portable medium is approved by the third-party device, and
   at the second storing, the second electronic device stores the second configuration information in the portable medium after the third configuration information of the portable medium collected by the tamper-resistant chip mounted on the portable medium is approved by the third-party device.

3. The network connecting method according to claim 2, wherein
   at the transmitting, the first electronic device also transmits the third configuration information acquired from the portable medium to the second electronic device, and at the controlling, the second electronic device also acquires the third configuration information of the portable medium from the portable medium, and controls the connection between the first electronic device and the second electronic device over the long-distance network based on the first configuration information, the second configuration information and the third configuration information received from the first electronic device.

4. The network connecting method according to claim 3, wherein
the portable medium also stores therein biological information of a user,
at the transmitting, the first electronic device also transmits the biological information acquired from the portable medium to the second electronic device, and
at the controlling, the second electronic device also acquires the biological information from the portable medium, and controls the connection between the first electronic device and the second electronic device over the long-distance network based on the first configuration information and the second configuration information, the third configuration information and the biological information received from the first electronic device.

5. A second electronic device comprising:
at least one processor; and
a memory which stores a plurality of instructions, which when executed by the at least one processor, cause the at least one processor to execute:
  acquiring first configuration information of a first electronic device from a portable medium, after being collected by a tamper-resistant chip mounted on the first electronic device and approved by a third-party device, wherein the first configuration information includes software codes of software installed in the first electronic device and hardware information of first hardware installed in the first electronic device, and the third-party device approves the first configuration information when the software codes included in the first configuration information and the hardware information included in the first configuration information correspond to software codes of the first electronic device stored in the third-party device and hardware information of the first electronic device stored in the third-party device respectively;
  storing second configuration information of the second electronic device in the portable medium after being collected by a tamper-resistant chip mounted on the second electronic device and approved by the third-party device, wherein the second configuration information includes software codes of software installed in the second electronic device and hardware information of second hardware installed in the second electronic device, and the third-party device approves the second configuration information when the software codes included in the second configuration information and the hardware information included in the second configuration information correspond to software codes of the second electronic device stored in the third-party device and hardware information of the second electronic device stored in the third-party device respectively;
  receiving the first configuration information of the first electronic device and the second configuration information of the second electronic device from the first electronic device over a long-distance network; and
  controlling connection between the first electronic device and the second electronic device over the long-distance network based on the first configuration information and the second configuration information received from the first electronic device.

\* \* \* \* \*